(12) United States Patent
Boyd et al.

(10) Patent No.: US 12,235,991 B2
(45) Date of Patent: Feb. 25, 2025

(54) OBSCURING ELEMENTS BASED ON BROWSER FOCUS

(71) Applicant: Snap Inc., Santa Monica, CA (US)

(72) Inventors: Nathan Kenneth Boyd, Los Angeles, CA (US); Laurent Desserrey, Los Angeles, CA (US); Alex Edelsburg, Seattle, WA (US); Daniel Moreno, Los Angeles, CA (US); David Paliwoda, London (GB); Jeremy Baker Voss, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 240 days.

(21) Appl. No.: 17/810,973

(22) Filed: Jul. 6, 2022

(65) Prior Publication Data

US 2024/0012929 A1 Jan. 11, 2024

(51) Int. Cl.
*G06F 21/62* (2013.01)
*H04L 51/043* (2022.01)

(52) U.S. Cl.
CPC ........ *G06F 21/6245* (2013.01); *H04L 51/043* (2013.01)

(58) Field of Classification Search
CPC ............................ G06F 21/6245; H04L 51/043
See application file for complete search history.

(56) References Cited

U.S. PATENT DOCUMENTS

| | | |
|---|---|---|
| 5,604,843 A | 2/1997 | Shaw et al. |
| 5,689,559 A | 11/1997 | Park |
| 5,880,731 A | 3/1999 | Liles et al. |
| 6,023,270 A | 2/2000 | Brush, II et al. |
| RE36,919 E | 10/2000 | Park |
| RE37,052 E | 2/2001 | Park |
| 6,223,165 B1 | 4/2001 | Lauffer |
| 6,650,793 B1 | 11/2003 | Lund et al. |
| 6,772,195 B1 | 8/2004 | Hatlelid et al. |
| 6,804,417 B1 | 10/2004 | Lund et al. |
| 6,842,779 B1 | 1/2005 | Nishizawa |

(Continued)

FOREIGN PATENT DOCUMENTS

| | | |
|---|---|---|
| CN | 109863532 | 6/2019 |
| CN | 110168478 | 8/2019 |

(Continued)

OTHER PUBLICATIONS

U.S. Appl. No. 17/810,984, filed Jul. 6, 2022, Obscuring Elements Based on User Input.

(Continued)

*Primary Examiner* — Kambiz Zand
*Assistant Examiner* — Afaq Ali
(74) *Attorney, Agent, or Firm* — Schwegman Lundberg & Woessner, P.A.

(57) ABSTRACT

Aspects of the present disclosure involve a system for hiding conversation elements. The system accesses a conversation interface of a messaging application on a web browser and presents the conversation interface in a window associated with the web browser. The conversation interface comprises a plurality of conversation elements. The system accesses a focus status of the window and, in response to determining that the focus status indicates that the window has lost focus, obscures a first subset of the plurality of conversation elements.

20 Claims, 10 Drawing Sheets

(56) References Cited

U.S. PATENT DOCUMENTS

| | | | |
|---|---|---|---|
| 7,188,143 B2* | 3/2007 | Szeto | H04L 51/04 709/227 |
| 7,342,587 B2 | 3/2008 | Danzig et al. | |
| 7,468,729 B1 | 12/2008 | Levinson | |
| 7,636,755 B2 | 12/2009 | Blattner et al. | |
| 7,639,251 B2 | 12/2009 | Gu et al. | |
| 7,775,885 B2 | 8/2010 | Van et al. | |
| 7,859,551 B2 | 12/2010 | Bulman et al. | |
| 7,861,176 B2 | 12/2010 | Weisberg | |
| 7,885,931 B2 | 2/2011 | Seo et al. | |
| 7,925,703 B2 | 4/2011 | Dinan et al. | |
| 8,088,044 B2 | 1/2012 | Tchao et al. | |
| 8,095,878 B2 | 1/2012 | Bates et al. | |
| 8,108,774 B2 | 1/2012 | Finn et al. | |
| 8,117,281 B2 | 2/2012 | Robinson et al. | |
| 8,130,219 B2 | 3/2012 | Fleury et al. | |
| 8,146,005 B2 | 3/2012 | Jones et al. | |
| 8,151,191 B2 | 4/2012 | Nicol | |
| RE43,993 E | 2/2013 | Park | |
| 8,384,719 B2 | 2/2013 | Reville et al. | |
| RE44,054 E | 3/2013 | Kim | |
| RE44,068 E | 3/2013 | Park | |
| RE44,106 E | 3/2013 | Park | |
| 8,396,708 B2 | 3/2013 | Park et al. | |
| RE44,121 E | 4/2013 | Park | |
| 8,425,322 B2 | 4/2013 | Gillo et al. | |
| 8,458,601 B2 | 6/2013 | Castelli et al. | |
| 8,462,198 B2 | 6/2013 | Lin et al. | |
| 8,484,158 B2 | 7/2013 | Deluca et al. | |
| 8,495,503 B2 | 7/2013 | Brown et al. | |
| 8,495,505 B2 | 7/2013 | Smith et al. | |
| 8,504,926 B2 | 8/2013 | Wolf | |
| 8,559,980 B2 | 10/2013 | Pujol | |
| 8,564,621 B2 | 10/2013 | Branson et al. | |
| 8,564,710 B2 | 10/2013 | Nonaka et al. | |
| 8,581,911 B2 | 11/2013 | Becker et al. | |
| 8,597,121 B2 | 12/2013 | del Valle | |
| 8,601,051 B2 | 12/2013 | Wang | |
| 8,601,379 B2 | 12/2013 | Marks et al. | |
| 8,632,408 B2 | 1/2014 | Gillo et al. | |
| 8,648,865 B2 | 2/2014 | Dawson et al. | |
| 8,659,548 B2 | 2/2014 | Hildreth | |
| 8,683,354 B2 | 3/2014 | Khandelwal et al. | |
| 8,692,830 B2 | 4/2014 | Nelson et al. | |
| 8,739,048 B2* | 5/2014 | Moudy | G06F 16/00 715/758 |
| 8,810,513 B2 | 8/2014 | Ptucha et al. | |
| 8,812,171 B2 | 8/2014 | Filev et al. | |
| 8,832,201 B2 | 9/2014 | Wall | |
| 8,832,552 B2 | 9/2014 | Arrasvuori et al. | |
| 8,839,327 B2 | 9/2014 | Amento et al. | |
| 8,890,926 B2 | 11/2014 | Tandon et al. | |
| 8,892,999 B2 | 11/2014 | Nims et al. | |
| 8,924,250 B2 | 12/2014 | Bates et al. | |
| 8,963,926 B2 | 2/2015 | Brown et al. | |
| 8,989,786 B2 | 3/2015 | Feghali | |
| 9,086,776 B2 | 7/2015 | Ye et al. | |
| 9,105,014 B2 | 8/2015 | Collet et al. | |
| 9,241,184 B2 | 1/2016 | Weerasinghe | |
| 9,256,860 B2 | 2/2016 | Herger et al. | |
| 9,298,257 B2 | 3/2016 | Hwang et al. | |
| 9,314,692 B2 | 4/2016 | Konoplev et al. | |
| 9,330,483 B2 | 5/2016 | Du et al. | |
| 9,357,174 B2 | 5/2016 | Li et al. | |
| 9,361,510 B2 | 6/2016 | Yao et al. | |
| 9,378,576 B2 | 6/2016 | Bouaziz et al. | |
| 9,402,057 B2 | 7/2016 | Kaytaz et al. | |
| 9,412,192 B2 | 8/2016 | Mandel et al. | |
| 9,460,541 B2 | 10/2016 | Li et al. | |
| 9,489,760 B2 | 11/2016 | Li et al. | |
| 9,503,845 B2 | 11/2016 | Vincent | |
| 9,508,197 B2 | 11/2016 | Quinn et al. | |
| 9,532,364 B2 | 12/2016 | Fujito | |
| 9,544,257 B2 | 1/2017 | Ogundokun et al. | |
| 9,576,400 B2 | 2/2017 | Van Os et al. | |
| 9,589,357 B2 | 3/2017 | Li et al. | |
| 9,592,449 B2 | 3/2017 | Barbalet et al. | |
| 9,648,376 B2 | 5/2017 | Chang et al. | |
| 9,697,635 B2 | 7/2017 | Quinn et al. | |
| 9,706,040 B2 | 7/2017 | Kadirvel et al. | |
| 9,744,466 B2 | 8/2017 | Fujioka | |
| 9,746,990 B2 | 8/2017 | Anderson et al. | |
| 9,749,270 B2 | 8/2017 | Collet et al. | |
| 9,792,714 B2 | 10/2017 | Li et al. | |
| 9,839,844 B2 | 12/2017 | Dunstan et al. | |
| 9,883,838 B2 | 2/2018 | Kaleal, III et al. | |
| 9,898,849 B2 | 2/2018 | Du et al. | |
| 9,911,073 B1 | 3/2018 | Spiegel et al. | |
| 9,936,165 B2 | 4/2018 | Li et al. | |
| 9,959,037 B2 | 5/2018 | Chaudhri et al. | |
| 9,980,100 B1 | 5/2018 | Charlton et al. | |
| 9,990,373 B2 | 6/2018 | Fortkort | |
| 10,039,988 B2 | 8/2018 | Lobb et al. | |
| 10,097,492 B2 | 10/2018 | Tsuda et al. | |
| 10,116,598 B2 | 10/2018 | Tucker et al. | |
| 10,155,168 B2 | 12/2018 | Blackstock et al. | |
| 10,158,589 B2 | 12/2018 | Collet et al. | |
| 10,242,477 B1 | 3/2019 | Charlton et al. | |
| 10,242,503 B2 | 3/2019 | McPhee et al. | |
| 10,262,250 B1 | 4/2019 | Spiegel et al. | |
| 10,348,662 B2 | 7/2019 | Baldwin et al. | |
| 10,362,219 B2 | 7/2019 | Wilson et al. | |
| 10,432,559 B2 | 10/2019 | Baldwin et al. | |
| 10,454,857 B1 | 10/2019 | Blackstock et al. | |
| 10,475,225 B2 | 11/2019 | Park et al. | |
| 10,504,266 B2 | 12/2019 | Blattner et al. | |
| 10,573,048 B2 | 2/2020 | Ni et al. | |
| 10,656,797 B1 | 5/2020 | Alvi et al. | |
| 10,657,695 B2 | 5/2020 | Chand et al. | |
| 10,657,701 B2 | 5/2020 | Osman et al. | |
| 10,762,174 B2 | 9/2020 | Denton et al. | |
| 10,805,248 B2 | 10/2020 | Luo et al. | |
| 10,872,451 B2 | 12/2020 | Sheth et al. | |
| 10,880,246 B2 | 12/2020 | Baldwin et al. | |
| 10,895,964 B1 | 1/2021 | Grantham et al. | |
| 10,896,534 B1 | 1/2021 | Smith et al. | |
| 10,933,311 B2 | 3/2021 | Brody et al. | |
| 10,938,758 B2 | 3/2021 | Allen et al. | |
| 10,964,082 B2 | 3/2021 | Amitay et al. | |
| 10,979,752 B1 | 4/2021 | Brody et al. | |
| 10,984,575 B2 | 4/2021 | Assouline et al. | |
| 10,992,619 B2 | 4/2021 | Antmen et al. | |
| 11,010,022 B2 | 5/2021 | Alvi et al. | |
| 11,030,789 B2 | 6/2021 | Chand et al. | |
| 11,036,781 B1 | 6/2021 | Baril et al. | |
| 11,063,891 B2 | 7/2021 | Voss | |
| 11,069,103 B1 | 7/2021 | Blackstock et al. | |
| 11,080,917 B2 | 8/2021 | Monroy-hernández et al. | |
| 11,128,586 B2 | 9/2021 | Al Majid et al. | |
| 11,188,190 B2 | 11/2021 | Blackstock et al. | |
| 11,189,070 B2 | 11/2021 | Jahangiri et al. | |
| 11,199,957 B1 | 12/2021 | Alvi et al. | |
| 11,218,433 B2 | 1/2022 | Baldwin et al. | |
| 11,229,849 B2 | 1/2022 | Blackstock et al. | |
| 11,245,658 B2 | 2/2022 | Grantham et al. | |
| 11,249,614 B2 | 2/2022 | Brody | |
| 11,263,254 B2 | 3/2022 | Baril et al. | |
| 11,270,491 B2 | 3/2022 | Monroy-Hernández et al. | |
| 11,284,144 B2 | 3/2022 | Kotsopoulos et al. | |
| 11,356,580 B1 | 6/2022 | Bartha et al. | |
| 2002/0067362 A1 | 6/2002 | Agostino Nocera et al. | |
| 2002/0161896 A1 | 10/2002 | Wen et al. | |
| 2002/0169644 A1 | 11/2002 | Greene | |
| 2005/0162419 A1 | 7/2005 | Kim et al. | |
| 2005/0206610 A1 | 9/2005 | Cordelli | |
| 2006/0149818 A1 | 7/2006 | Odell et al. | |
| 2006/0294465 A1 | 12/2006 | Ronen et al. | |
| 2007/0067733 A1 | 3/2007 | Moore et al. | |
| 2007/0101009 A1 | 5/2007 | Chen et al. | |
| 2007/0113181 A1 | 5/2007 | Blattner et al. | |
| 2007/0168863 A1 | 7/2007 | Blattner et al. | |
| 2007/0176921 A1 | 8/2007 | Iwasaki et al. | |
| 2007/0208862 A1 | 9/2007 | Fox et al. | |

(56) References Cited

U.S. PATENT DOCUMENTS

| | | | |
|---|---|---|---|
| 2007/0245249 A1* | 10/2007 | Weisberg | G06F 9/451 709/204 |
| 2008/0158222 A1 | 7/2008 | Li et al. | |
| 2008/0282160 A1 | 11/2008 | Tonnison et al. | |
| 2009/0016617 A1 | 1/2009 | Bregman-amitai et al. | |
| 2009/0055484 A1 | 2/2009 | Vuong et al. | |
| 2009/0070688 A1 | 3/2009 | Gyorfi et al. | |
| 2009/0099925 A1 | 4/2009 | Mehta et al. | |
| 2009/0106672 A1 | 4/2009 | Burstrom | |
| 2009/0138606 A1 | 5/2009 | Moran et al. | |
| 2009/0158170 A1 | 6/2009 | Narayanan et al. | |
| 2009/0177976 A1 | 7/2009 | Bokor et al. | |
| 2009/0202114 A1 | 8/2009 | Morin et al. | |
| 2009/0265604 A1 | 10/2009 | Howard et al. | |
| 2009/0300525 A1 | 12/2009 | Jolliff et al. | |
| 2009/0303984 A1 | 12/2009 | Clark et al. | |
| 2010/0011422 A1 | 1/2010 | Mason et al. | |
| 2010/0023885 A1 | 1/2010 | Reville et al. | |
| 2010/0115426 A1 | 5/2010 | Liu et al. | |
| 2010/0162149 A1 | 6/2010 | Sheleheda et al. | |
| 2010/0203968 A1 | 8/2010 | Gill et al. | |
| 2010/0227682 A1 | 9/2010 | Reville et al. | |
| 2011/0093780 A1 | 4/2011 | Dunn | |
| 2011/0115798 A1 | 5/2011 | Nayar et al. | |
| 2011/0145744 A1* | 6/2011 | Haynes | G06Q 10/107 715/779 |
| 2011/0148864 A1 | 6/2011 | Lee et al. | |
| 2011/0239136 A1 | 9/2011 | Goldman et al. | |
| 2012/0042261 A1 | 2/2012 | Phillips et al. | |
| 2012/0113106 A1 | 5/2012 | Choi et al. | |
| 2012/0124458 A1 | 5/2012 | Cruzada | |
| 2012/0130717 A1 | 5/2012 | Xu et al. | |
| 2013/0060871 A1 | 3/2013 | Downes et al. | |
| 2013/0103760 A1 | 4/2013 | Golding et al. | |
| 2013/0201187 A1 | 8/2013 | Tong et al. | |
| 2013/0249948 A1 | 9/2013 | Reitan | |
| 2013/0257877 A1 | 10/2013 | Davis | |
| 2013/0332870 A1 | 12/2013 | Kim et al. | |
| 2014/0043329 A1 | 2/2014 | Wang et al. | |
| 2014/0055554 A1 | 2/2014 | Du et al. | |
| 2014/0125678 A1 | 5/2014 | Wang et al. | |
| 2014/0129343 A1 | 5/2014 | Finster et al. | |
| 2014/0173121 A1 | 6/2014 | Qiu | |
| 2015/0149645 A1* | 5/2015 | Mendez | G06F 40/143 709/227 |
| 2015/0206349 A1 | 7/2015 | Rosenthal et al. | |
| 2015/0356304 A1 | 12/2015 | You | |
| 2016/0134840 A1 | 5/2016 | Mcculloch | |
| 2016/0234149 A1 | 8/2016 | Tsuda et al. | |
| 2017/0080346 A1 | 3/2017 | Abbas | |
| 2017/0087473 A1 | 3/2017 | Siegel et al. | |
| 2017/0113140 A1 | 4/2017 | Blackstock et al. | |
| 2017/0118145 A1 | 4/2017 | Aittoniemi et al. | |
| 2017/0199855 A1 | 7/2017 | Fishbeck | |
| 2017/0235848 A1 | 8/2017 | Van Deusen et al. | |
| 2017/0285880 A1 | 10/2017 | Yang et al. | |
| 2017/0310934 A1 | 10/2017 | Du et al. | |
| 2017/0312634 A1 | 11/2017 | Ledoux et al. | |
| 2017/0336960 A1* | 11/2017 | Chaudhri | H04L 51/18 |
| 2017/0357390 A1 | 12/2017 | Alonso Ruiz et al. | |
| 2017/0359390 A1 | 12/2017 | Khan et al. | |
| 2018/0047200 A1 | 2/2018 | O'hara et al. | |
| 2018/0113587 A1 | 4/2018 | Allen et al. | |
| 2018/0115503 A1 | 4/2018 | Baldwin et al. | |
| 2018/0124609 A1* | 5/2018 | Ciano | G06F 21/629 |
| 2018/0129396 A1* | 5/2018 | Buckley | G06F 3/04895 |
| 2018/0198743 A1 | 7/2018 | Blackstock et al. | |
| 2018/0315076 A1 | 11/2018 | Andreou | |
| 2018/0315133 A1 | 11/2018 | Brody et al. | |
| 2018/0315134 A1 | 11/2018 | Amitay et al. | |
| 2019/0001223 A1 | 1/2019 | Blackstock et al. | |
| 2019/0057616 A1 | 2/2019 | Cohen et al. | |
| 2019/0097958 A1 | 3/2019 | Collet et al. | |
| 2019/0188920 A1 | 6/2019 | Mcphee et al. | |
| 2019/0280997 A1 | 9/2019 | Baldwin et al. | |
| 2020/0110899 A1 | 4/2020 | Atoun et al. | |
| 2020/0306637 A1 | 10/2020 | Baldwin et al. | |
| 2020/0372127 A1 | 11/2020 | Denton et al. | |
| 2020/0410575 A1 | 12/2020 | Grantham et al. | |
| 2021/0074047 A1 | 3/2021 | Sheth et al. | |
| 2021/0089179 A1 | 3/2021 | Grantham et al. | |
| 2021/0104087 A1 | 4/2021 | Smith et al. | |
| 2021/0160200 A1 | 5/2021 | Cho et al. | |
| 2021/0168108 A1 | 6/2021 | Antmen et al. | |
| 2021/0170270 A1 | 6/2021 | Brody et al. | |
| 2021/0192823 A1 | 6/2021 | Amitay et al. | |
| 2021/0209825 A1 | 7/2021 | Assouline et al. | |
| 2021/0225058 A1 | 7/2021 | Chand et al. | |
| 2021/0240315 A1 | 8/2021 | Alvi et al. | |
| 2021/0243482 A1 | 8/2021 | Baril et al. | |
| 2021/0243503 A1 | 8/2021 | Kotsopoulos et al. | |
| 2021/0266277 A1 | 8/2021 | Allen et al. | |
| 2021/0281897 A1 | 9/2021 | Brody et al. | |
| 2021/0285774 A1 | 9/2021 | Collins et al. | |
| 2021/0306290 A1 | 9/2021 | Voss | |
| 2021/0306451 A1 | 9/2021 | Heikkinen et al. | |
| 2021/0385180 A1 | 12/2021 | Al Majid et al. | |
| 2021/0405831 A1 | 12/2021 | Mourkogiannis et al. | |
| 2021/0409535 A1 | 12/2021 | Mourkogiannis et al. | |
| 2022/0012929 A1 | 1/2022 | Blackstock et al. | |
| 2022/0391059 A1* | 12/2022 | Xu | G06F 3/0484 |
| 2024/0005041 A1* | 1/2024 | Bhattathiri | G06F 21/554 |
| 2024/0012930 A1 | 1/2024 | Boyd et al. | |
| 2024/0015126 A1 | 1/2024 | Boyd et al. | |

FOREIGN PATENT DOCUMENTS

| | | |
|---|---|---|
| EP | 2184092 | 5/2010 |
| JP | 2001230801 | 8/2001 |
| JP | 5497931 | 3/2014 |
| KR | 100390555 | 7/2003 |
| KR | 101445263 | 9/2014 |
| WO | 2003094072 | 11/2003 |
| WO | 2004095308 | 11/2004 |
| WO | 2006107182 | 10/2006 |
| WO | 2007134402 | 11/2007 |
| WO | 2012139276 | 10/2012 |
| WO | 2013027893 | 2/2013 |
| WO | 2013152454 | 10/2013 |
| WO | 2013166588 | 11/2013 |
| WO | 2014031899 | 2/2014 |
| WO | 2014194439 | 12/2014 |
| WO | 2016090605 | 6/2016 |
| WO | 2018081013 | 5/2018 |
| WO | 2018102562 | 6/2018 |
| WO | 2018129531 | 7/2018 |
| WO | 2019089613 | 5/2019 |
| WO | 2024011054 | 1/2024 |
| WO | 2024011055 | 1/2024 |
| WO | 2024011125 | 1/2024 |

OTHER PUBLICATIONS

U.S. Appl. No. 17/810,992, filed Jul. 6, 2022, Managing Content Across Multiple Windows.

"U.S. Appl. No. 17/810,992, Non Final Office Action mailed Jul. 14, 2023", 14 pgs.

"U.S. Appl. No. 17/810,992, Response filed Sep. 11, 2023 to Non Final Office Action mailed Jul. 14, 2023", 9 pgs.

"International Application Serial No. PCT US2023 069333, International Search Report mailed Oct. 18, 2023", 3 pgs.

"International Application Serial No. PCT US2023 069333, Written Opinion mailed Oct. 18, 2023", 4 pgs.

"International Application Serial No. PCT US2023 069330, International Search Report mailed Oct. 20, 2023", 3 pgs.

"International Application Serial No. PCT US2023 069330, Written Opinion mailed Oct. 20, 2023", 4 pgs.

"International Application Serial No. PCT US2023 069636, International Search Report mailed Oct. 20, 2023", 3 pgs.

"International Application Serial No. PCT US2023 069636, Written Opinion mailed Oct. 20, 2023", 4 pgs.

(56) References Cited

OTHER PUBLICATIONS

"U.S. Appl. No. 17/810,992, Final Office Action mailed Dec. 29, 2023", 19 pgs.

"U.S. Appl. No. 17/810,992, Response filed Jan. 31, 2024 to Final Office Action mailed Dec. 29, 2023", 9 pgs.

"U.S. Appl. No. 17/810,992, Advisory Action mailed Feb. 13, 2024", 3 pgs.

"Bitmoji Customize text", [Online] Retrieved from the Internet: URL: https: web.archive.org web 20210225200456 https: support.bitmoji.com hc en-us articles 360034632291-Customize-Text-on-Bitmoji-Stickers, (captured Feb. 25, 2021), 3 pgs.

"Bitmoji Chrome Extension", [Online] Retrieved from the Internet: URL: https: web.archive.org web 20200919024925 https: support.bimoji.com hc en-us articles 360001494066, (Sep. 19, 2020), 5 pgs.

"Bitmoji", Snapchat Support, [Online] Retrieved from the Internet: URL: https: web.archive.org web 20190503063620 https: support.snapchat.com en-US a bitmoji, (captured May 3, 2019), 2 pgs.

"Manage Your Bitmoji", Snapchat Support, [Online] Retrieved from the Internet: URL: https: web.archive.org web 20190503063620 https: support.snapchat.com en-US a manage-bitmoji, (captured May 3, 2019), 3 pgs.

"Bitmoji Family", Snapchat Support, [Online] Retrieved from the Internet: URL: https: web.archive.org web 20190503063620 https: support.snapchat.com en-US article bitmoji-family, (captured May 3, 2019), 4 pgs.

"Your Own Personal Emoji", Bitstrips Inc, [Online] Retrieved from the Internet: URL: https: web.archive.org web 20150205232004 http: bitmoji.com , (captured Feb. 5, 2015), 3 pgs.

"Instant Comics Starring You and Your Friends", Bitstrips Inc, [Online] Retrieved from the Internet: URL: https: web.archive.org web 20150206000940 http: company.bitstrips.com bitstrips-app.html, (captured Feb. 6, 2015), 3 pgs.

Carnahan, Daniel, "Snap is Offering Personalized Video Content Through Bitmoji TV", Business Insider, [Online] Retrieved from the Internet: URL: https: www.businessinsider.com snap-offers-personalized-video-content-through-bitmoji-tv-2019-12, (2019), 10 pgs.

Constine, Josh, "Snapchat launces Bitmoji merch and comic strips starring your avatar", TechCrunch, [Online] Retrieved from the Internet: URL: https: techcrunch.com Nov. 13, 2018 bitmoji-store , (Nov. 13, 2018), 16 pgs.

Constine, Josh, "Snapchat Launches Bitmoji TV: Zany 4-min Cartoons of Your Avatar", TechCrunch, [Online] Retrieved from the Internet: URL: https: techcrunch.com Jan. 30, 2020 bitmoji-tv , (Jan. 30, 2020), 13 pgs.

MacMillan, Douglas, "Snapchat Buys Bitmoji App for More Than $100 Million", The Wallstreet Journal, [Online] Retrieved from the Internet: URL: https: www.wsj.com articles snapchat-buys-bitmoji-app-for-more-than-100-million-1458876017, (Mar. 25, 2016), 5 pgs.

Newton, Casey, "Your Snapchat friendships now have their own profiles—and merchandise", The Verge, [Online] Retrieved from the Internet: URL: https: www.theverge.com Nov. 13, 2018 18088772 snapchat-friendship-profiles-bitmoji-merchandise-comics, (Nov. 13, 2018), 5 pgs.

Ong, Thuy, "Snapchat takes Bitmoji deluxe with hundreds of new customization options", The Verge, [Online] Retrieved from the Internet on Nov. 2, 2018: URL: https: www.theverge.com Jan. 30, 2018 16949402 bitmoji-deluxe-snapchat-customization, (Jan. 30, 2018), 2 pgs.

Reign, Ashley, "How To Add My Friend's Bitmoji To My Snapchat", Women.com, [Online] Retrieved from the Internet: URL: https: www.women.com ashleyreign lists how-to-add-my-friends-bitmoji-to-my-snapchat, (Jun. 30, 2017), 7 pgs.

Tumbokon, Karen, "Snapchat Update: How To Add Bitmoji To Customizable Geofilters", International Business Times, [Online] Retrieved from the Internet : URL: https: www.ibtimes.com snapchat-update-how-add-bitmojicustomizable-geofilters-2448152, (Nov. 18, 2016), 6 pgs.

"U.S. Appl. No. 17/810,984, Examiner Interview Summary mailed Aug. 14, 2024", 2 pgs.

"U.S. Appl. No. 17/810,984, Non Final Office Action mailed Jun. 5, 2024", 35 pgs.

"U.S. Appl. No. 17/810,984, Response filed Aug. 30, 2024 to Non Final Office Action mailed Jun. 5, 2024", 10 pgs.

"U.S. Appl. No. 17/810,992, Examiner Interview Summary mailed Sep. 4, 2024", 2 pgs.

"U.S. Appl. No. 17/810,992, Non Final Office Action mailed Jun. 20, 2024", 19 pgs.

"U.S. Appl. No. 17/810,992, Response filed Sep. 9, 2024 to Non Final Office Action mailed Jun. 20, 2024", 10 pgs.

"U.S. Appl. No. 17/810,992, Final Office Action mailed Sep. 16, 2024", 24 pgs.

\* cited by examiner

OBSCURING ELEMENTS BASED ON BROWSER FOCUS

TECHNICAL FIELD

The present disclosure relates generally to accessing online services using a browser.

BACKGROUND

Messaging applications allow users to communicate with each other in a variety of different ways. Users can send chat messages to one or more other users. Users can also access certain group pages and view and post content to such pages.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

Figure 1:
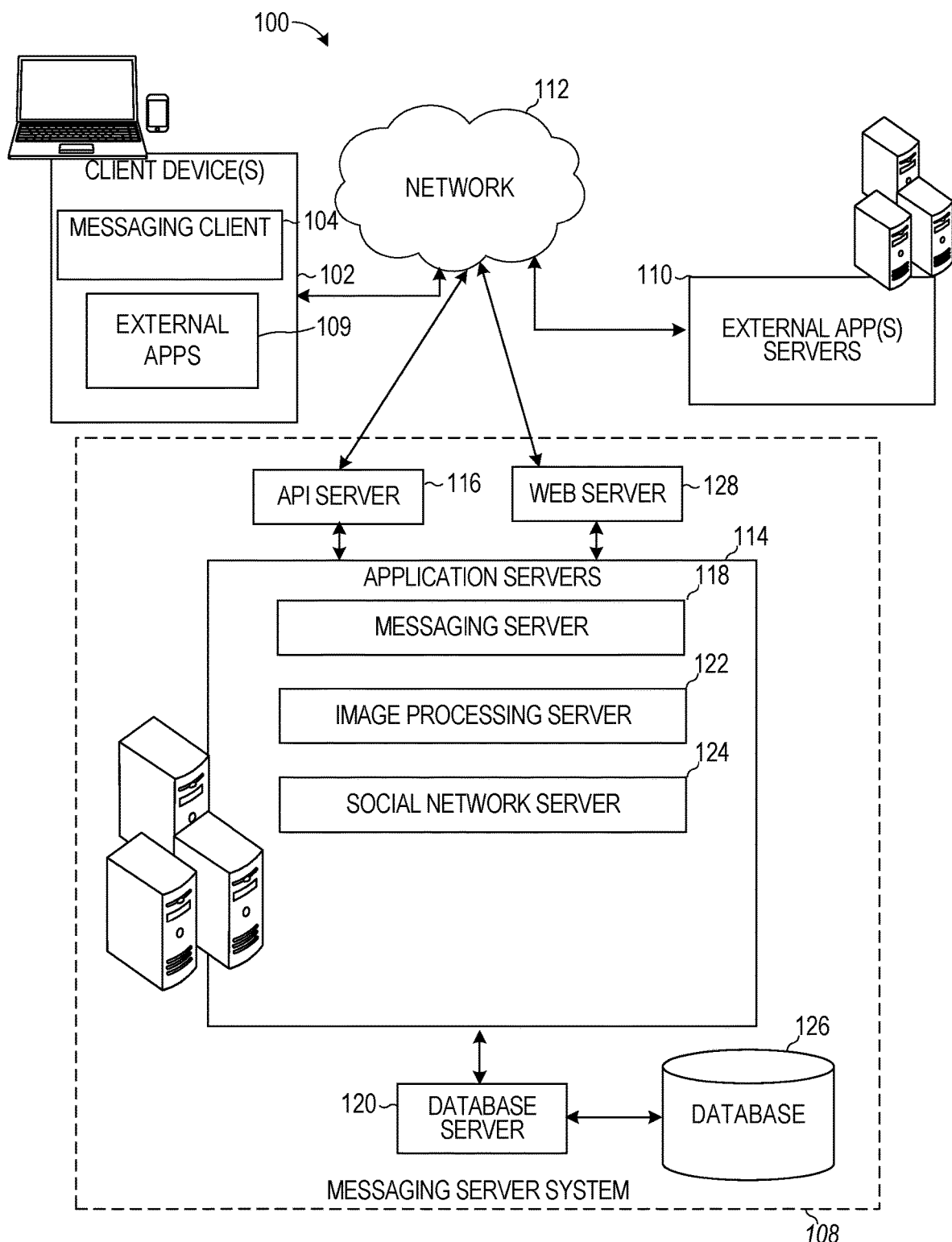
FIG. 1 is a diagrammatic representation of a networked environment in which the present disclosure may be deployed, in accordance with some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples. It will be evident, however, to those skilled in the art, that examples may be practiced without these specific details. In general, well-known instruction instances, protocols, structures, and techniques are not necessarily shown in detail.

With the wide-spread use of mobile devices, such as smart phones and tablets, many online services are provided as standalone client-side applications designed for use with mobile devices rather than as websites that are accessed using a traditional web browser (e.g., Chrome). For example, messaging applications are typically implemented as client-side application executing on mobile devices to enable end users to communicate with each other while the users are on the move. While being able to use an online service from any location provides flexibility and convenience, in some cases users may prefer to access the service using a traditional web browser. For example, during traditional working hours many users are using a desktop or laptop computer for prolonged periods of time. In these cases, accessing an online service via a web-browser may be more convenient as users do not have to toggle between devices and may be prohibited from installing client-side applications to their work computers.

An additional reason that users may prefer to access an online service using a web browser is that it allows users to multitask by easily toggling between multiple windows and web browser tabs. Due to the limited display size on mobile devices, client-side applications executed on mobile devices are presented one at a time. In contrast, multiple windows can be displayed concurrently when using a desktop or laptop computer. Users can toggle between them by simply selecting a window to bring it into focus.

The ability to view multiple windows on a screen simultaneously may be present challenges, however, when implementing a web-browser based version of an online service rather than a client-side application version for a mobile device. For example, some online services may present confidential and/or private data that should be hidden when not being actively viewed by a user. When implemented as a client-side application on a mobile device, any private data that is presented is naturally hidden when the user navigates to another application as mobile devices present one application at a time. In contrast, the private data may remain visible in a web-browser based implementation as a window can remain visible, even when not in focus (e.g., active use) by the user. Accordingly, confidential and or private data may be unintentionally compromised.

Some online services may implement ephemeral functionality that is triggered when content is viewed (e.g., seen) by a user. For example, a messaging service may be designed to automatically delete messages or other shared content after the content is viewed by a user or a threshold period of time after the content is viewed by the user. This functionality may be inadvertently triggered in a web-browser based implementation even though the user did not actually view the content. For example, the content may appear in a window that is not in focus while the user's is working or viewing another window. As a result, content may be deleted prior to it being viewed by the user.

The disclosed techniques solve these technical issues by providing intelligence that ensures that the same level of privacy, security, protection, and functionality that is offered by accessing an application on mobile devices is maintained cross platform when the application is accessed using a web-browser. For example, a web-browser based version of an application can be designed to obscure or restrict certain features/content when certain conditions are met, such as detecting that the window in which the application is being presented is not in focus. As an example, certain conversation features presented by a messaging application can be restricted from being viewed or accessed when the messaging application detects that a window in which a conversation interface of the messaging application is presented is not in focus. As another example, financial data presented by a financial application may be restricted from being viewed or accessed when the window in which the financial application is presented is not in focus. This protects private data from being viewed by another user or captured via a screenshot, as well as prevents ephemeral functionality from being inadvertently triggered. In this way, the level of privacy, security, protection, and functionality users expect when accessing the application is maintained cross-platform.

In these ways, the techniques described herein improve the efficiency of using the electronic device and the overall experience of the user in using the electronic device.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other external applications 109 (e.g., third-party applications). Each messaging client 104 is communicatively coupled to other instances of the messaging client 104 (e.g., hosted on respective other client devices 102), a messaging server system 108 and external app(s) servers 110 via a network 112 (e.g., the Internet). A messaging client 104 can also communicate with locally-hosted third-party applications (also referred to as "external applications" and "external apps") 109 using Application Program Interfaces (APIs).

In some examples, the client device 102 can include AR glasses or an AR headset in which virtual content is displayed within lenses of the glasses while a user views a real-world environment through the lenses. For example, an image can be presented on a transparent display that allows a user to simultaneously view content presented on the display and real-world objects.

A messaging client 104 (e.g., client-side application or web-browser) is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces of the messaging client 104.

Turning now specifically to the messaging server system 108, an API server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114 and provides web-based interfaces to the application servers 114. To this end, the web server 128 processes incoming network requests over the Hypertext Transfer Protocol (HTTP) and several other related protocols.

The API server 116 receives and transmits message data (e.g., commands and message payloads) between the client device 102 and the application servers 114. Specifically, the API server 116 provides a set of interfaces (e.g., routines and protocols) that can be called or queried by the messaging client 104 in order to invoke functionality of the application servers 114. The API server 116 exposes various functions supported by the application servers 114, including account registration; login functionality; the sending of messages, via the application servers 114, from a particular messaging client 104 to another messaging client 104; the sending of media files (e.g., images or video) from a messaging client 104 to a messaging server 118, and for possible access by another messaging client 104; the settings of a collection of media data (e.g., story); the retrieval of a list of friends of a user of a client device 102; the retrieval of such collections, the retrieval of messages and content; the addition and deletion of entities (e.g., friends) to an entity graph (e.g., a social graph); the location of friends within a social graph; and opening an application event (e.g., relating to the messaging client 104).

The application servers 114 host a number of server applications and subsystems, including, for example, a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor- and memory-intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Figure 2:
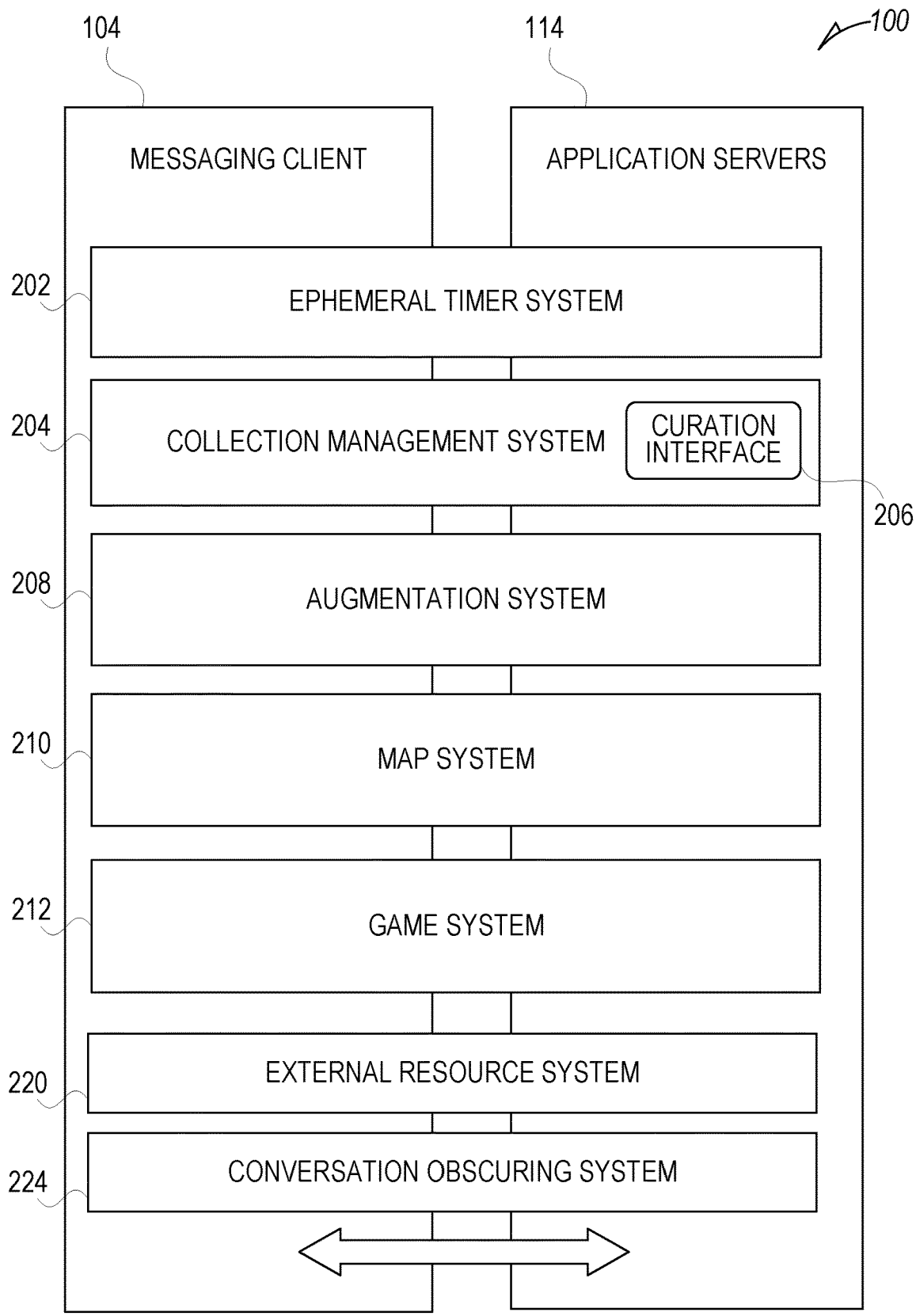
FIG. 2 is a diagrammatic representation of a messaging client application, in accordance with some examples.

Image processing server 122 is used to implement scan functionality of the augmentation system 208 (shown in FIG. 2). Scan functionality includes activating and providing one or more AR experiences on a client device 102 when an image is captured by the client device 102. Specifically, the messaging client 104 on the client device 102 can be used to activate a camera. The camera displays one or more real-time images or a video to a user along with one or more icons or identifiers of one or more AR experiences. The user can select a given one of the identifiers to launch the corresponding AR experience or perform a desired image modification (e.g., launching an AR experience, as discussed in connection with FIGS. 6-10 below).

Figure 3:
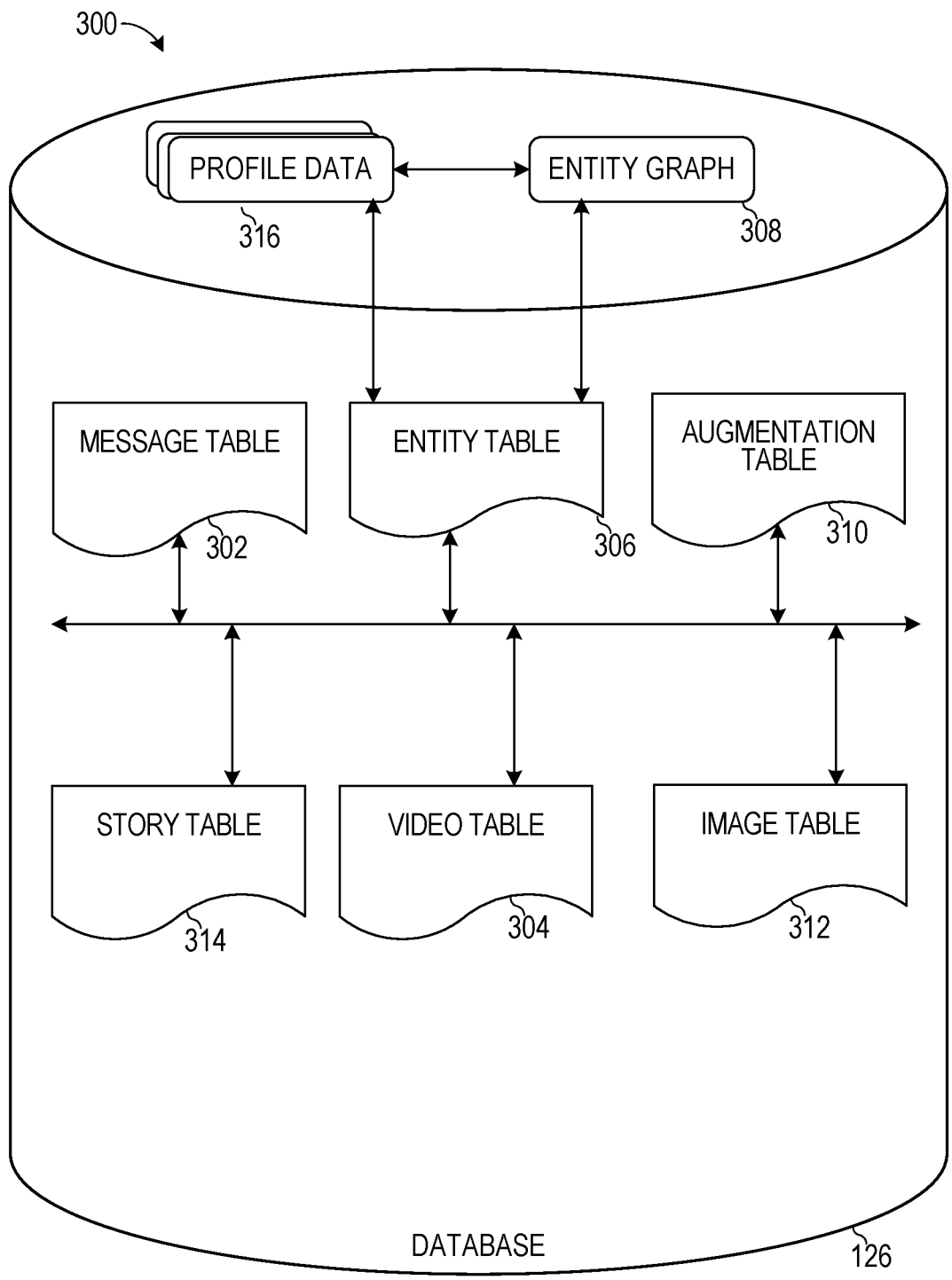
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., a third-party application 109 or applet) are made available to a user via an interface of the messaging client 104. The messaging client 104 receives a user selection of an option to launch or access features of an external resource (e.g., a third-party resource), such as external apps 109. The external resource may be a third-party application (external apps 109) installed on the client device 102 (e.g., a "native app"), or a small-scale version of the third-party application (e.g., an "applet") that is hosted on the client device 102 or remote of the client device 102 (e.g., on external resource or app(s) servers 110). The small-scale version of the third-party application includes a subset of features and functions of the third-party application (e.g., the full-scale, native version of the third-party standalone application) and is implemented using a markup-language document. In one example, the small-scale version of the third-party application (e.g., an "applet") is a web-based, markup-language version of the third-party application and is embedded in the messaging client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource (e.g., external app 109), the messaging client 104 determines whether the selected external resource is a web-based external resource or a locally-installed external application. In some cases, external applications 109 that are locally installed on the client device 102 can be launched independently of and separately from the messaging client 104, such as by selecting an icon, corresponding to the external application 109, on a home screen of the client device 102. Small-scale versions of such external applications can be launched or accessed via the messaging client 104 and, in some examples, no or limited portions of the small-scale external application can be accessed outside of the messaging client 104. The small-scale external application can be launched by the messaging client 104 receiving, from an external app(s) server 110, a markup-language document associated with the small-scale external application and processing such a document.

In response to determining that the external resource is a locally-installed external application 109, the messaging client 104 instructs the client device 102 to launch the external application 109 by executing locally-stored code corresponding to the external application 109. In response to determining that the external resource is a web-based resource, the messaging client 104 communicates with the external app(s) servers 110 to obtain a markup-language document corresponding to the selected resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using a respective messaging client messaging clients 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., third-party or external applications 109 or applets) to a user to launch or access a given external resource. This list can be presented in a context-sensitive menu. For example, the icons representing different ones of the external applications 109 (or applets) can vary based on how the menu is launched by the user (e.g., from a conversation interface or from a non-conversation interface).

In some examples, the messaging client 104 is accessed on a web browser application, such as a web browser implemented on a desktop computer or other client device 102. The messaging client 104 provides a conversation interface for display on the web browser application. In such cases, certain functions and features of the messaging client 104 can be restricted or obscured when certain conditions are met. For example, the messaging client 104 accesses focus status or state information from the web browser application. The focus status or state information indicates whether a web browser window and/or tab that is presenting messaging client 104 is in focus. A web browser window and/or tab is in focus when the graphical user interface window or tab is presented at the front by the underlying operating system and can be actively engaged with by a user through use of the various input devices of the client device 102. In contrast, a window or tab is not in focus when another window, tab, or other computing element (e.g., desktop) is in focus and can be actively engaged with by a user. A window or tab may be brought in and out of focus by selection of the window by a user or selection of another window, tab, or computing element.

Based on the focus state or status, the messaging client 104 updates the display of the conversation interface to conditionally obscure or restrict access to certain conversation elements. In some cases, the messaging client 104 obscures a first subset of conversation elements in response to receiving a focus status or state information indicating that a window of the web browser application in which the conversation interface is displayed is not in focus. In some cases, the messaging client 104 modifies one or more display properties of a second subset of conversation elements in response to receiving focus status or state information indicating that a window of the web browser application in which the conversation interface is displayed is not in focus. The messaging client 104 may update the display of the conversation interface again to unobscured any obscured elements in response to receiving a focus status or state information indicating that the window of the web browser application in which the conversation interface is displayed is in focus. In some examples, in addition to, or alternative to, obscuring, restricting, or modifying opacity of content that is displayed, the content can be removed in its entirety.

Further details of the functions performed by the messaging client 104 are discussed below, in FIGS. 2 and 5, in connection with the conversation obscuring system 224. While the present disclosure describes the concept of adjusting the display of a web-browser window or tab based on the focus state in relation to a messaging application, this is just one example and is not meant to be limiting. Similar techniques can be used in relation to any variety of online service that is provided through a web-browser application, such as financial service, online retail service, and the like.

System Architecture

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client side by the messaging client 104 and on the sever side by the application servers 114. These subsystems include, for example, an ephemeral timer system 202, a collection management system 204, an augmentation system 208, a map system 210, a game system 212, an external resource system 220, and a conversation obscuring system 224.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text, a graphical element, or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time. The augmentation system 208 communicates with the image processing server 122 to obtain AR experiences and presents identifiers of such experiences in one or more user interfaces (e.g., as icons over a real-time image or video or as thumbnails or icons in interfaces dedicated for presented identifiers of AR experiences). Once an AR experience is selected, one or more images, videos, or AR graphical elements are retrieved and presented as an overlay on top of the images or video captured by the client device 102. In some cases, the camera is switched to a front-facing view (e.g., the front-facing camera of the client device 102 is activated in response to activation of a particular AR experience) and the images from the front-facing camera of the client device 102 start being displayed on the client device 102 instead of the rear-facing camera of the client device 102. The one or more images, videos, or AR graphical elements are retrieved and presented as an overlay on top of the images that are captured and displayed by the front-facing camera of the client device 102.

In other examples, the augmentation system 208 is able to communicate and exchange data with another augmentation system 208 on another client device 102 and with the server via the network 112. The data exchanged can include a session identifier that identifies the shared AR session, a transformation between a first client device 102 and a second client device 102 (e.g., a plurality of client devices 102 include the first and second devices) that is used to align the shared AR session to a common point of origin, a common coordinate frame, and functions (e.g., commands to invoke functions) as well as other payload data (e.g., text, audio, video or other multimedia data).

The augmentation system 208 sends the transformation to the second client device 102 so that the second client device 102 can adjust the AR coordinate system based on the transformation. In this way, the first and second client devices 102 synch up their coordinate systems and frames for displaying content in the AR session. Specifically, the augmentation system 208 computes the point of origin of the second client device 102 in the coordinate system of the first client device 102. The augmentation system 208 can then determine an offset in the coordinate system of the second client device 102 based on the position of the point of origin from the perspective of the second client device 102 in the coordinate system of the second client device 102. This offset is used to generate the transformation so that the second client device 102 generates AR content according to a common coordinate system or frame as the first client device 102.

The augmentation system 208 can communicate with the client device 102 to establish individual or shared AR sessions. The augmentation system 208 can also be coupled to the messaging server 118 to establish an electronic group communication session (e.g., group chat, instant messaging) for the client devices 102 in a shared AR session. The electronic group communication session can be associated with a session identifier provided by the client devices 102 to gain access to the electronic group communication session and to the shared AR session. In one example, the client devices 102 first gain access to the electronic group communication session and then obtain the session identifier in the electronic group communication session that allows the client devices 102 to access to the shared AR session. In some examples, the client devices 102 are able to access the shared AR session without aid or communication with the augmentation system 208 in the application servers 114.

The map system 210 provides various geographic location functions and supports the presentation of map-based media content and messages by the messaging client 104. For example, the map system 210 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games (e.g., web-based games or web-based applications) that can be launched by a user within the context of the messaging client 104 and played with other users of the messaging system 100. The messaging system 100 further enables a particular user to invite other users to participate in the play of a specific game by issuing invitations to such other users from the messaging client 104. The messaging client 104 also supports both voice and text messaging (e.g., chats) within the context of gameplay, provides a leaderboard for the games, and supports the provision of in-game rewards (e.g., coins and items).

The external resource system 220 provides an interface for the messaging client 104 to communicate with external app(s) servers 110 to launch or access external resources. Each external resource (apps) server 110 hosts, for example, a markup language (e.g., HTML5) based application or small-scale version of an external application (e.g., game, utility, payment, or ride-sharing application that is external to the messaging client 104). The messaging client 104 may launch a web-based resource (e.g., application) by accessing the HTML5 file from the external resource (apps) servers 110 associated with the web-based resource. In certain examples, applications hosted by external resource servers 110 are programmed in JavaScript leveraging a Software Development Kit (SDK) provided by the messaging server 118. The SDK includes APIs with functions that can be called or invoked by the web-based application. In certain examples, the messaging server 118 includes a JavaScript library that provides a given third-party resource access to certain user data of the messaging client 104. HTML5 is used as an example technology for programming games, but applications and resources programmed based on other technologies can be used.

In order to integrate the functions of the SDK into the web-based resource, the SDK is downloaded by an external resource (apps) server 110 from the messaging server 118 or is otherwise received by the external resource (apps) server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., third-party or external applications 109 or applets and the messaging client 104). This provides the user with a seamless experience of communicating with other users on the messaging client 104, while also preserving the look and feel of the messaging client 104. To bridge communications between an external resource and a messaging client 104, in certain examples, the SDK facilitates communication between external resource servers 110 and the messaging client 104. In certain examples, a Web ViewJavaScript-Bridge running on a client device 102 establishes two one-way communication channels between an external resource and the messaging client 104. Messages are sent between the external resource and the messaging client 104 via these communication channels asynchronously. Each SDK function invocation is sent as a message and callback.

Each SDK function is implemented by constructing a unique callback identifier and sending a message with that callback identifier.

By using the SDK, not all information from the messaging client 104 is shared with external resource servers 110. The SDK limits which information is shared based on the needs of the external resource. In certain examples, each external resource server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a graphical user interface (GUI) of the messaging client 104 to access features of the web-based external resource, the messaging client 104 obtains the HTML5 file and instantiates the resources necessary to access the features of the web-based external resource.

The messaging client 104 presents a GUI (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another GUI of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale external applications (e.g., a third-party or external application 109) are provided with access to a first type of user data (e.g., only two-dimensional (2D) avatars of users with or without different avatar characteristics). As another example, external resources that include small-scale versions of external applications (e.g., web-based versions of third-party applications) are provided with access to a second type of user data (e.g., payment information, 2D avatars of users, 3D avatars of users, and avatars with various avatar characteristics). Avatar characteristics include different ways to customize a look and feel of an avatar, such as different poses, facial features, clothing, and so forth.

The conversation obscuring system 224 monitors a focus state of a display of a conversation interface of the messaging client 104 when such a display is presented on a web browser implemented on a particular type of client device 102, such as a desktop computer. The conversation obscuring system 224 conditionally alters display properties of conversation elements of the conversation interface based on the focus state. Conversation elements can include user identifiers, chat input regions, messages exchanged, presence or user status indicators, phone call status indicators and options for placing phone calls, group names, and various other conversation related information. While the present disclosure describes the concept of adjusting the display of a web-browser window or tab based on the focus state in relation to conversation elements, this is just one example and is not meant to be limiting. Similar techniques can be used in relation to any variety of online service that is provided through a web-browser application, such as financial service, online retail service, and the like. For example, in financial services applications, financial elements, such as personally identifying information (PII) and other account information, can be obscured.

In some cases, the conversation obscuring system 224 blocks, restricts, or obscures certain conversation elements of the conversation interface based on the focus state (e.g., when the conversation interface display is not currently in focus). In this way, the conversation obscuring system 224 preserves the privacy, security, and protection of the messaging client 104 when the messaging client 104 is accessed on different types of devices (e.g., cross platform).

Data Architecture

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message, and included within the message data stored in the message table 302, are described below with reference to FIG. 4.

An entity table 306 stores entity data and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization), interested-based, or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a user name, telephone number, address, and settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

The database 126 can also store data pertaining to individual and shared AR sessions. This data can include data communicated between an AR session client controller of a first client device 102 and another AR session client controller of a second client device 102, and data communicated between the AR session client controller and the augmentation system 208. Data can include data used to establish the common coordinate frame of the shared AR scene, the transformation between the devices, the session identifier, images depicting a body, skeletal joint positions, wrist joint positions, feet, and so forth.

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes AR content items (e.g., corresponding to applying AR experiences). An AR content item or AR item may be a real-time special effect and sound that may be added to an image or a video.

As described above, augmentation data includes AR content items, overlays, image transformations, AR images, and similar terms that refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple AR content items, a user can use a single video clip with multiple AR content items to see how the different AR content items will modify the stored clip. For example, multiple AR content items that apply different pseudorandom movement models can be applied to the same content by selecting different AR content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different AR content items will look within different windows in a display at the same time. This can, for example, enable multiple windows with different pseudorandom animations to be viewed on a display at the same time.

Data and various systems using AR content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a 3D mesh model of the object or objects and using transformations and animated textures of the model within the video to achieve the transformation. In other examples, tracking of points on an object may be used to place an image or texture (which may be 2D or 3D) at the tracked position. In still further examples, neural network analysis of video frames may be used to place images, models, or textures in content (e.g., images or frames of video). AR content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of an object's elements, characteristic points for each element of an object are calculated (e.g., using an Active Shape Model (ASM) or other known methods). Then, a mesh based on the characteristic points is generated for each of the at least one elements of the object. This mesh is used in the following stage of tracking the elements of the object in the video stream. In the process of tracking, the mentioned mesh for each element is aligned with a position of each element. Then, additional points are generated on the mesh. A set of first points is generated for each element based on a request for modification, and a set of second points is generated for each element based on the set of first points and the request for modification. Then, the frames of the video stream can be transformed by modifying the elements of the object on the basis of the sets of first and second points and the mesh.

In such a method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh and then various areas based on the points are generated. The elements of the object are then tracked by aligning the area for each element with a position for each of the at least one elements, and properties of the areas can be modified based on the request for modification, thus transforming the frames of the video stream. Depending on the specific request for modification, properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an ASM algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search is started for landmarks from the mean shape aligned to the position and size of the face determined by a global face detector. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transformation system initiates a process to convert the image of the user to reflect the selected modification icon (e.g., generate a smiling face on the user). A modified image or video stream may be presented in a graphical user interface displayed on the client device 102 as soon as the image or video stream is captured and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured and the selected modification icon remains toggled. Machine-taught neural networks may be used to enable such modifications.

The GUI, presenting the modification performed by the transformation system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a GUI. In some examples, individual faces, among a group of multiple faces, may be individually modified, or such modifications may be individually toggled by tapping or selecting the individual face or a series of individual faces displayed within the GUI.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

The data structures 300 can also store training data for training one or more machine learning techniques (models) to segment real-world objects or items of real-world environment depicted in an image corresponding to a location (e.g., a room in a home). The training data can include a plurality of images and videos and their corresponding ground-truth room segmentations. The images and videos can include a mix of all sorts of real-world objects that can appear in different rooms in a home or household. The one or more machine learning techniques can be trained to extract features of a received input image or video and establish a relationship between the extracted features and a segmentations. Once trained, the machine learning technique can receive a new image or video and can compute a segmentation of items depicted in the newly received image or video.

Data Communications Architecture

Figure 4:
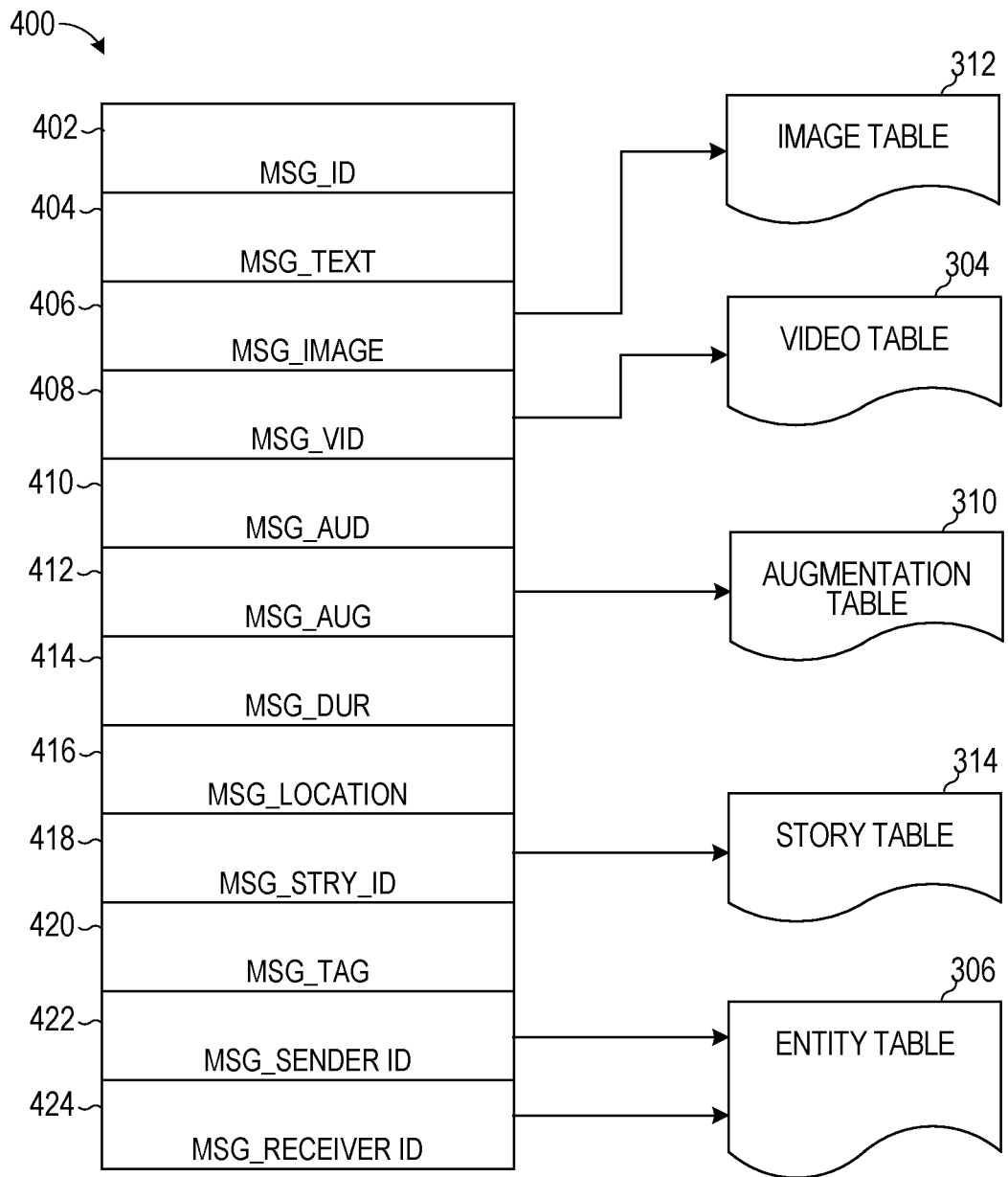
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message 400 is shown to include the following example components:

message identifier 402: a unique identifier that identifies the message 400.
message text payload 404: text, to be generated by a user via a user interface of the client device 102, and that is included in the message 400.
message image payload 406: image data, captured by a camera component of a client device 102 or retrieved from a memory component of a client device 102, and that is included in the message 400. Image data for a sent or received message 400 may be stored in the image table 312.
message video payload 408: video data, captured by a camera component or retrieved from a memory component of the client device 102, and that is included in the message 400. Video data for a sent or received message 400 may be stored in the video table 304.
message audio payload 410: audio data, captured by a microphone or retrieved from a memory component of the client device 102, and that is included in the message 400.
message augmentation data 412: augmentation data (e.g., filters, stickers, or other annotations or enhancements) that represents augmentations to be applied to message image payload 406, message video payload 408, or message audio payload 410 of the message 400. Augmentation data 412 for a sent or received message 400 may be stored in the augmentation table 310.
message duration parameter 414: parameter value indicating, in seconds, the amount of time for which content of the message (e.g., the message image payload 406, message video payload 408, message audio payload 410) is to be presented or made accessible to a user via the messaging client 104.
message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).
message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.
message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
message sender identifier 422: an identifier (e.g., a messaging system identifier, email address, or device identifier) indicative of a user of the client device 102 on which the message 400 was generated and from which the message 400 was sent.
message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentation data 412 may point to data stored in an augmentation table 310, values stored within the message story identifier 418 may point to data stored in a story table 314, and values stored within the message sender identifier 422 and the message receiver identifier 424 may point to user records stored within an entity table 306.

Conversation Obscuring System

Figure 5:
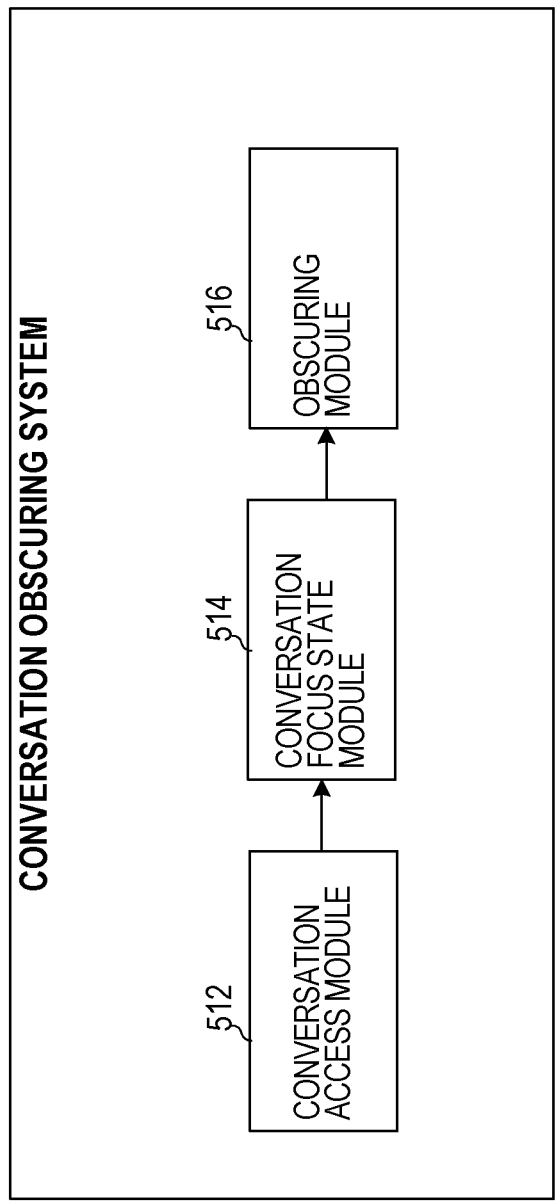
FIG. 5 is a diagrammatic representation of a conversation obscuring system, in accordance with some examples.

FIG. 5 is a diagrammatic representation of the conversation obscuring system 224, in accordance with some examples. The conversation obscuring system 224 can include a conversation access module 512, a conversation focus state module 514, and an obscuring module 516.

In some examples, the conversation obscuring system 224 accesses a conversation interface of a messaging application on a web browser and presents the conversation interface in a window associated with the web browser. The conversation interface can comprise a plurality of conversation elements. The conversation obscuring system 224 accesses a focus status of the window and, in response to determining that the focus status indicates that the window has lost focus, obscures a first subset of the plurality of conversation elements. In some cases, the web browser is implemented on a desktop computer.

In some examples, the conversation obscuring system 224 retrieves a universal resource locator (URL) of the messaging application and downloads a markup language document corresponding to the messaging application. The conversation obscuring system 224 processes the markup language document by the web browser application to display the conversation interface on, for example, the desktop computer.

In some examples, the conversation obscuring system 224 modifies a display attribute of a second subset of the plurality of conversation elements, the second subset being different than the first subset. In some examples, the focus status changes from being in focus to losing focus in response to determining that a different window of the web browser is being viewed. In some examples, the focus status changes from being in focus to losing focus in response to detecting user interaction with a portion of a display that excludes the window. In some examples, the focus status changes from being in focus to losing focus in response to determining that the window has been minimized or has been obscured by a different window. In some cases, the focus status is received from the web browser application.

In some examples, the plurality of conversation elements include a chat region that includes one or more messages exchanged in a conversation, a chat input region for enabling a user to compose a message, a presence region that indicates an activity state of each of a plurality of friends, a friends region that lists the plurality of friends with whom the user has previously engaged in a conversation, and a phone call region for placing a phone call to a given friend. In such cases, the first subset of the plurality of conversation elements includes the chat region and the presence region. The conversation obscuring system 224 modifies a display attribute of the chat input region, such as, by reducing an opacity of the chat input region by a specified amount (e.g., by 50 percent).

In some examples, the conversation obscuring system 224 obscures the first subset of the plurality of conversation elements by presenting an overlay on top of a chat region that includes one or more messages exchanged in a conversation. The overlay can include a message indicting that a user of the web browser is no longer present. The overlay can include an avatar of the user or representing the conversation. In some examples, in response to determining that the focus status of the window has been lost, the avatar of the user for whom the focus has been lost may be removed from being presented to other users involved in the conversation. In some examples, in response to determining that the focus status of the window has been lost, the presence status of the user (presented to other users involved in the conversation) for whom the focus has been lost may be updated to indicate that the user is no longer present.

In some examples, the conversation obscuring system 224, after obscuring the first subset of the plurality of conversation elements, determines that the focus status of the window is in focus. In such cases, the conversation obscuring system 224 detects an interaction with the conversation interface and reveals the first subset of the plurality of conversation elements in response to detecting the interaction with the conversation interface.

In some examples, the conversation obscuring system 224 computes a duration between the focus status indicating that the window has lost focus and the focus status being in focus. The conversation obscuring system 224 compares the duration to a threshold duration (e.g., 60 seconds) and in response to determining that the duration transgresses (or exceeds) the threshold duration, presents an option to re-open the conversation interface. The first subset of the plurality of conversation elements can be revealed in response to selection of the option.

In some examples, the conversation access module 512 receives a request from a client device 102 to access a conversation interface of the messaging client 104. The conversation access module 512 can detect that the request has been received from a particular type of client device 102 (e.g., desktop computer) and/or from a particular type of software application (e.g., a web browser application). Namely, rather than launching the messaging client 104 directly from an application that runs on a mobile device that includes the code for executing the messaging client 104, the conversation access module 512 can enable a user to access content of the messaging client 104 via other types of client applications, such as web browsers.

In such cases, the conversation access module 512 provides a markup language document to the web browser application. The markup language document includes a visual display of a conversation interface that mimics the display of the conversation interface on a native messaging application implemented on the mobile device. Specifically, the conversation interface that is presented on the web browser application by processing the markup language document may have the same look and feel as the conversation interface accessed on the messaging client 104. In some cases, the conversation interface that is displayed by processing the markup language document differs from the conversation interface that is presented on the mobile device when the messaging client 104 is launched directly by executing the messaging client 104 software on the mobile device.

The conversation access module 512 determines that the type of client device 102 and/or software used to access the conversation interface corresponds to a specified type. In such cases, the conversation access module 512 conditions the display of the conversation interface information (e.g., conversation elements) and the manner in which the information is displayed based on certain conditions. As an example, the conversation access module 512 conditions the display of the conversation interface information (e.g., conversation elements) and the manner in which the information is displayed based on a focus state of the client device 102 and/or the software application.

Figure 6:
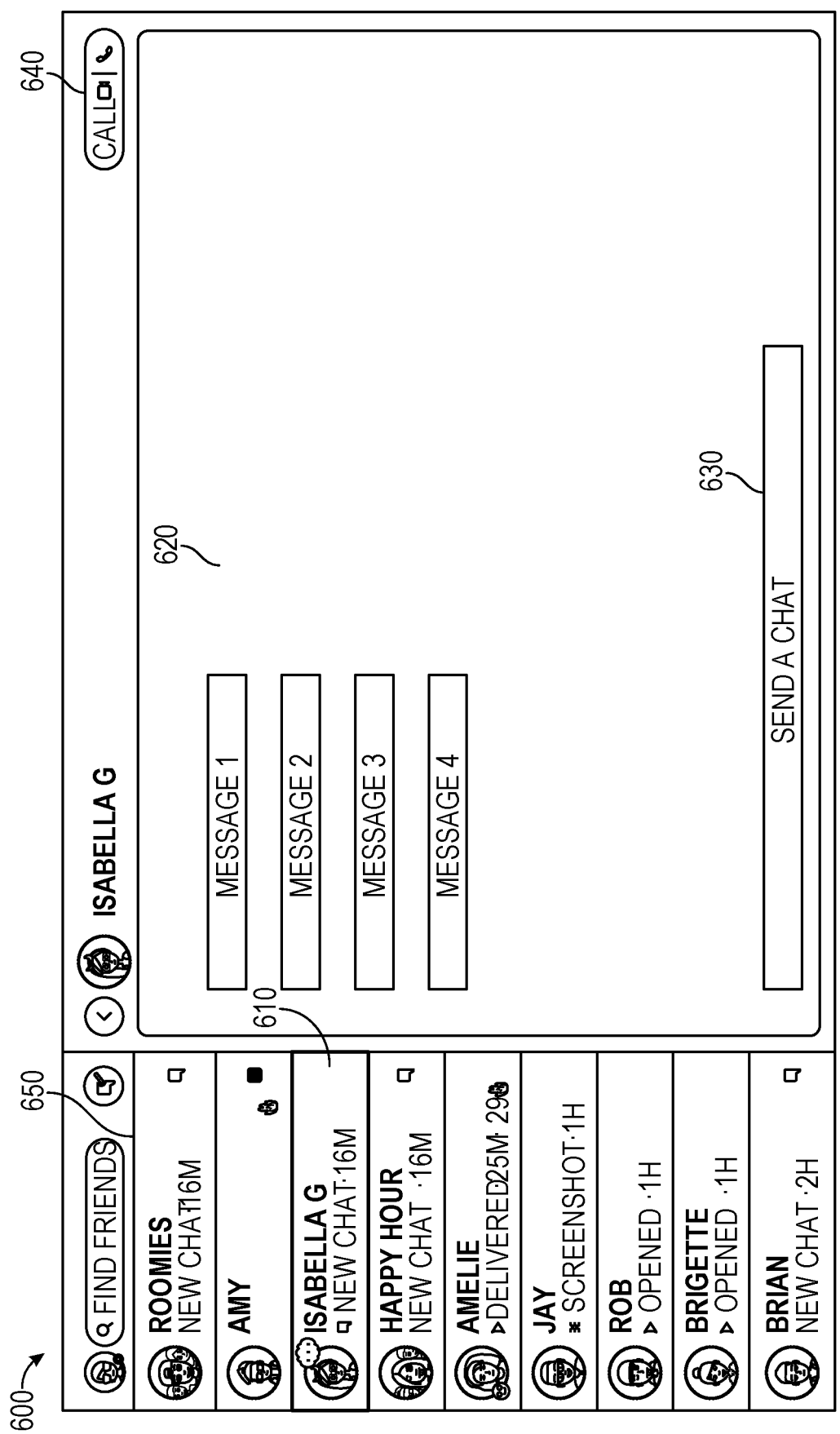
FIGS. 6 and 7 are diagrammatic representations of outputs of the conversation obscuring system, in accordance with some examples.

For example, as shown in FIG. 6, a user interface display 600 of a conversation interface of the messaging client 104 is provided by a web browser application implemented by a desktop computer (or mobile device). The user interface display 600 includes a friends list region 650, a presence region 610, a chat region 620, a chat input region 630, and a phone call region 640. The friends list region 650 displays a list of friends of a user of the client device 102 with which the user has previously exchanged at least one message or just generally displays a list of friends of the user on the messaging client 104. The user interface display 600 can receive input that selects a given friend from the friends list region 650. In response, the user interface display 600 displays in the chat region 620 a conversation including a list of messages previously exchanged with the given friend in a conversation. The chat region 620 may be blank if the user has not previously exchanged messages with the given friend that has been selected.

The user interface display 600 can receive input that selects the chat input region 630. In response, the user interface display 600 monitors keystrokes input by a physical keyboard and adds characters corresponding to the keystrokes into the chat input region 630. In response to receiving an ENTER key or other send option, the user interface display 600 transmits the collected characters from the chat input region 630 to the given friend associated with the conversation. For example, the user interface display 600 generates and adds a message to the chat region 620 corresponding to the collected characters for display in the conversation interface provided to the friends involved in the conversation. In some examples, the user interface display 600 receives input that selects a phone call region 640. In response, the user interface display 600 establishes a voice and/or video call with the given friend associated with the conversation being displayed in the chat region 620.

Referring back to FIG. 5, the conversation access module 512 communicates with the conversation focus state module 514 to monitor the focus state of the conversation interface. Specifically, the conversation interface of the messaging client 104 can be displayed in a given window or tab of the web browser application. The conversation focus state module 514 accesses or monitors status information received from the web browser application to determine whether or when the window or tab in which the conversation interface is displayed loses focus. In some examples, the web browser application or client device 102 is instructed to monitor the focus state of the conversation interface and to transmit a message or communication to the obscuring module 516 and/or the conversation access module 512 when the focus state changes.

In some examples, the conversation focus state module 514 detects that a new window has been opened in the web browser application. For example, the conversation focus state module 514 accesses a local storage in which identifiers of browser windows are stored to determine whether additional browser windows have been added to the list since the conversation interface was initially loaded. In response, the conversation focus state module 514 determines that the focus of the conversation interface window has been lost. In such cases, the conversation focus state module 514 transmits a message or communication to the conversation access module 512 and/or the obscuring module 516 indicating that the focus of the conversation window has been lost.

In some examples, the conversation focus state module 514 detects a user interaction with a portion of a display that excludes the window. For example, the conversation focus state module 514 determines that a mouse click has been received in a region outside of the window in which the conversation interface has been received. As another example, the conversation focus state module 514 determines that a keystroke has been recorded and received by another window or application that differs from the window in which the conversation interface is displayed. In response, the conversation focus state module 514 determines that the focus of the conversation interface window has been lost. In such cases, the conversation focus state module 514 transmits a message or communication to the conversation access module 512 and/or the obscuring module 516 indicating that the focus of the conversation window has been lost.

In some examples, the conversation focus state module 514 determines that the window in which the conversation interface is displayed has been minimized or has been obscured by a different window. In response, the conversation focus state module 514 determines that the focus of the conversation interface window has been lost. In such cases, the conversation focus state module 514 transmits a message or communication to the conversation access module 512 and/or the obscuring module 516 indicating that the focus of the conversation window has been lost.

The obscuring module 516 selectively and conditionally obscures or restricts certain features, functions, and/or conversation elements of the conversation interface (e.g., user interface display 600) from being displayed and/or used in response to determining that the focus of the conversation window has been lost (e.g., based on the message received from the conversation focus state module 514). In some examples, the obscuring module 516 obscures a first portion or first subset of conversation elements in response to determining that the focus of the conversation window has been lost and/or modifies a display attribute of a second portion or second subset of conversation elements.

Figure 7:
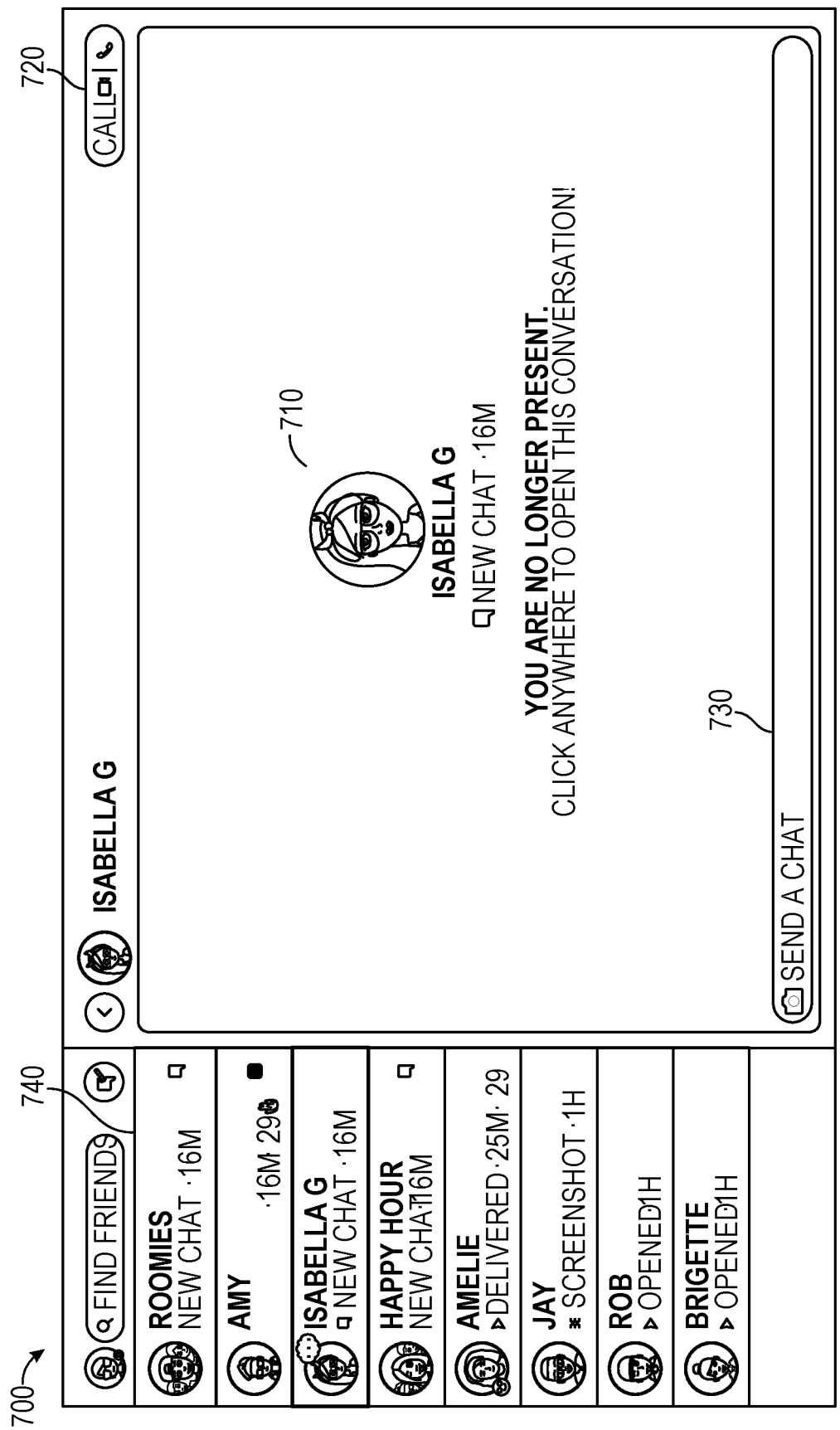

For example, as shown in FIG. 7, the obscuring module 516 generates a conversation interface display 700 in response to determining that the focus of the conversation window has been lost. The obscuring module 516 presents an overlay 710 on top of the entire chat region 620 in which the messages exchanged in a conversation are presented. This results in obscuring the messages exchanged in the conversation that are included as part of the chat region 620. The overlay 710 can include a notification indicating that the user is no longer present (e.g., informing the user about the window losing focus). The overlay 710 can include an avatar of the user and/or conversation. The overlay 710 can include a message informing the user to provide an interaction (e.g., click a mouse or keyboard) anywhere in the window in which the conversation interface is displayed to regain focus and to display the contents of the chat region 620.

In some examples, the obscuring module 516 modifies a display attribute of the chat input region 630 in response to determining that the focus of the conversation window has been lost. For example, the obscuring module 516 reduces or increases the opacity of the chat input region 630 by a certain amount, such as by 50 percent. In such cases, the obscuring module 516 causes display of a message in the chat input region 630 informing the user to input text or send a chat is reduced or increased in opacity to be less or more visible. In some examples, the obscuring module 516 removes or obscures the presence region 610 which indicates the current focus, location, or activity status of each friend listed in the list of friends region 740 or the friend that is part of the conversation of the chat region 620.

In some examples, the obscuring module 516 receives a message or notification indicating that the focus of the conversation interface display has been regained. Namely, the conversation focus state module 514 can continuously or periodically monitor the focus state of the display of the conversation interface to determine when focus has been lost and when focus has been regained. The conversation focus state module 514 can determine that focus has been regained when the window in which the conversation interface is displayed has been selected, such as by a mouse, and/or when the window or tab to which the user has shifted focus has been closed and/or when another window that overlaps the window in which the conversation interface is displayed has been closed or no longer overlaps the window of the conversation interface. In such cases, the conversation focus state module 514 can compute a difference in time between the time when the focus has been lost and when the focus has been regained. The conversation focus state module 514 can compare that difference to a threshold difference (e.g., 60 seconds). The conversation focus state module 514 can instruct the obscuring module 516 to perform a first function if the difference is below the threshold and to perform a second function if the difference exceeds or transgresses the threshold.

For example, after determining that the focus of the conversation interface window has been regained (e.g., after being lost), the obscuring module 516 removes the obstructions to reveal the content of the chat region 620 and undo the modifications to the display attributes to re-display the user interface display 600 (FIG. 6). The obscuring module 516 may continue to present the conversation interface with the obstructions (e.g., display 700) even after determining that the focus has been regained. The obscuring module 516 may only remove the obstructions and undo the modifications in response to detecting a user interaction (e.g., a mouse click or keystroke) within the window that displays the conversation interface. In some cases, the obscuring module 516 can present a prompt requesting that the user re-open the conversation interface in response to determining that the focus has been lost for more than the threshold amount of time (e.g., 60 seconds).

Namely, the obscuring module 516 can present a prompt with an option requesting that the user re-open the conversation interface in response to determining that the difference in time between the time when the focus has been lost and when the focus has been regained transgresses the threshold. In such cases, a simple keystroke or mouse click within the window that displays the conversation interface may not be sufficient to reveal the content of the chat region 620 and undo the modifications to the display attributes to re-display the user interface display 600 (FIG. 6). Specifically, in such cases, the obscuring module 516 may only reveal the content of the chat region 620 and undo the modifications to the display attributes to re-display the user interface display 600 (FIG. 6) in response to determining that the conversation interface has been reopened (e.g., after the user logs back into the messaging client 104). In some cases, the conversation interface may need to be opened in a new window or tab to reveal the content of the chat region 620 and undo the modifications to the display attributes to re-display the user interface display 600 (FIG. 6) if the difference in time between the time when the focus has been lost and when the focus has been regained transgresses the threshold (e.g., 60 seconds).

Figure 8:
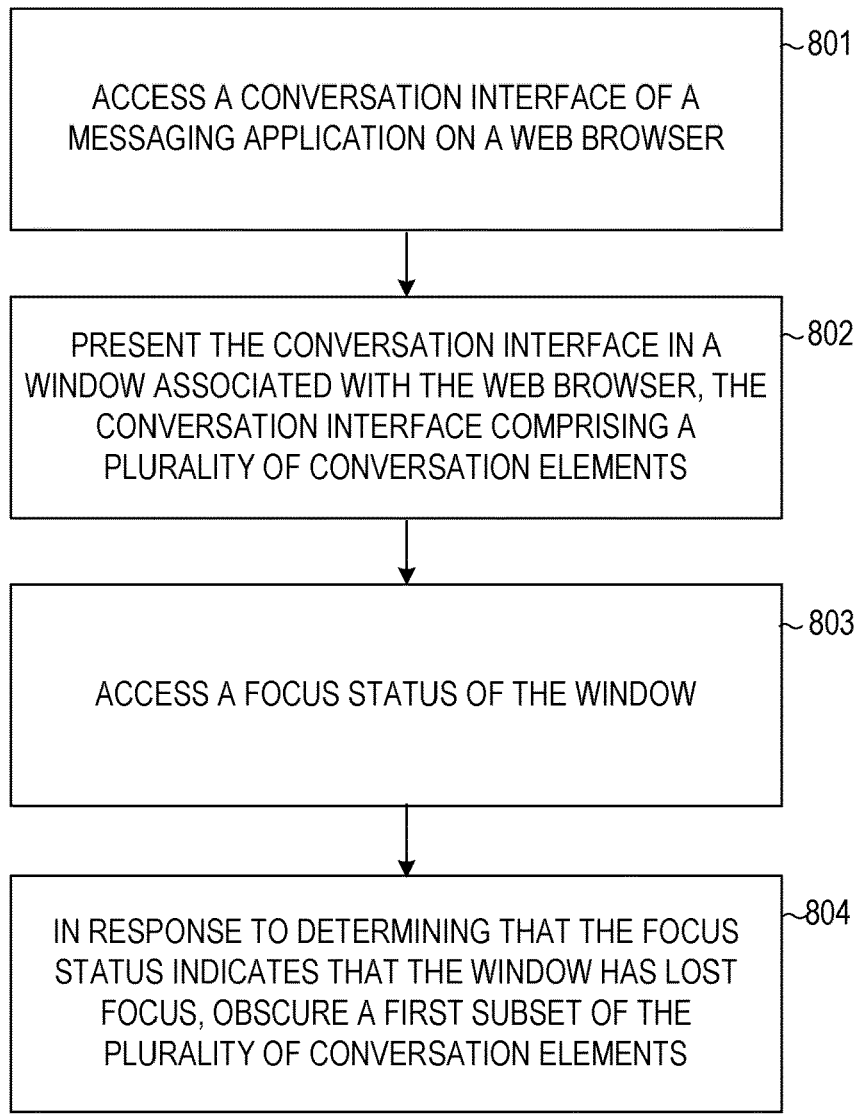
FIG. 8 is a flowchart illustrating example operations of the conversation obscuring system, according to some examples.

FIG. 8 is a flowchart of a process 800, in accordance with some examples. Although the flowchart can describe the operations as a sequential process, many of the operations can be performed in parallel or concurrently. In addition, the order of the operations may be re-arranged. A process is terminated when its operations are completed. A process may correspond to a method, a procedure, and the like. The steps of methods may be performed in whole or in part, may be performed in conjunction with some or all of the steps in other methods, and may be performed by any number of different systems or any portion thereof, such as a processor included in any of the systems.

At operation 801, a client device 102 accesses a conversation interface of a messaging application on a web browser, as discussed above.

At operation 802, the client device 102 presents the conversation interface in a window associated with the web browser, the conversation interface comprising a plurality of conversation elements, as discussed above.

At operation 803, the client device 102 accesses a focus status of the window, as discussed above.

At operation 804, the client device 102, in response to determining that the focus status indicates that the window has lost focus, obscures a first subset of the plurality of conversation elements, as discussed above.

Machine Architecture

Figure 9:
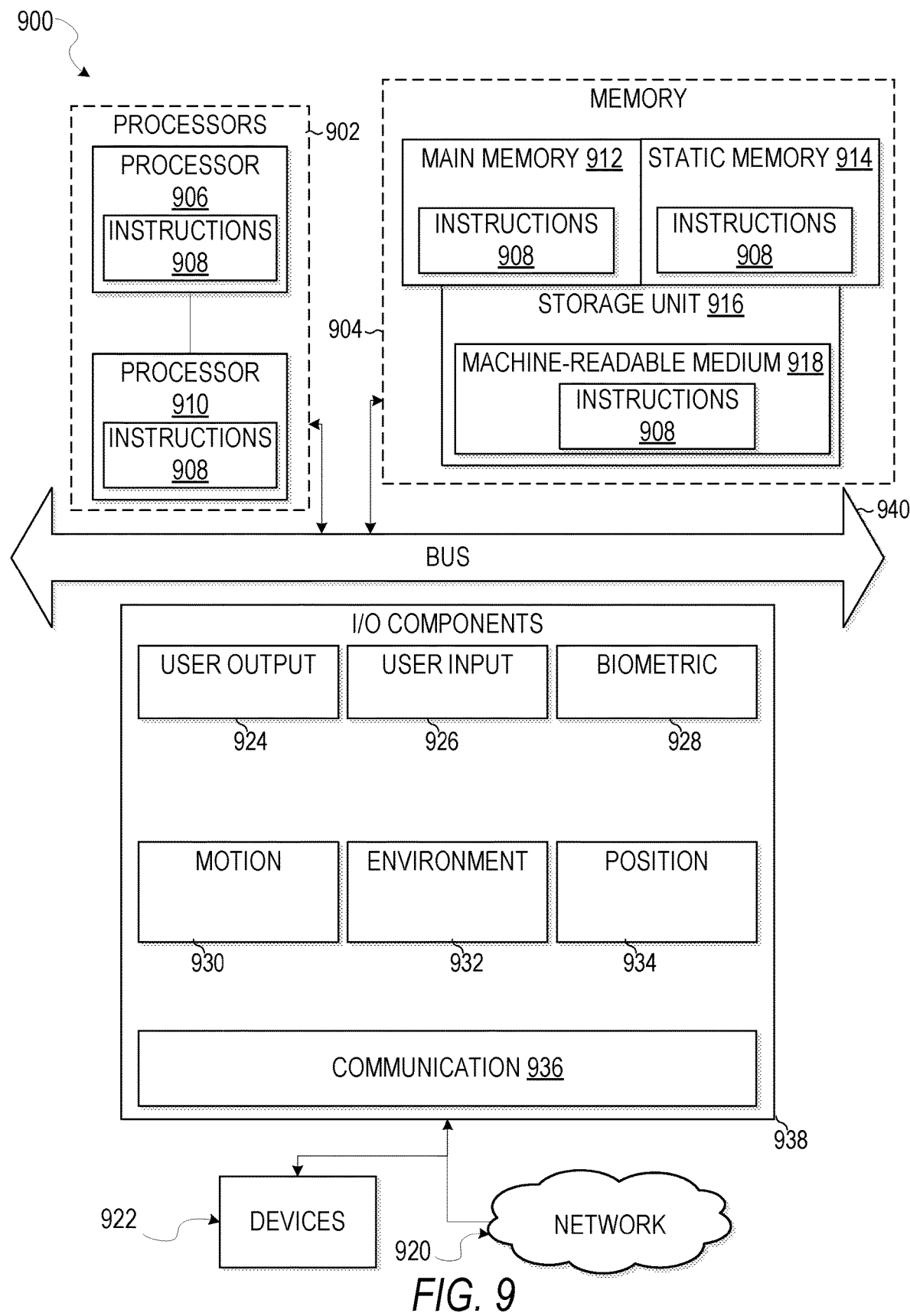
FIG. 9 is a diagrammatic representation of a machine in the form of a computer system within which a set of instructions may be executed for causing the machine to perform any one or more of the methodologies discussed herein, in accordance with some examples.

FIG. 9 is a diagrammatic representation of the machine 900 within which instructions 908 (e.g., software, a program, an application, an applet, an app, or other executable code) for causing the machine 900 to perform any one or more of the methodologies discussed herein may be executed. For example, the instructions 908 may cause the machine 900 to execute any one or more of the methods described herein. The instructions 908 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 908, sequentially or otherwise, that specify actions to be taken by the machine 900. Further, while only a single machine 900 is illustrated, the term "machine" shall also be taken to include a collection of machines that individually or jointly execute the instructions 908 to perform any one or more of the methodologies discussed herein. The machine 900, for example, may comprise the client device 102 or any one of a number of server devices forming part of the messaging server system 108. In some examples, the machine 900 may also comprise both client and server systems, with certain operations of a particular method or algorithm being performed on the server-side and with certain operations of the particular method or algorithm being performed on the client-side.

The machine 900 may include processors 902, memory 904, and input/output (I/O) components 938, which may be configured to communicate with each other via a bus 940. In an example, the processors 902 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 906 and a processor 910 that execute the instructions 908. The term "processor" is intended to include multi-core processors that may comprise two or more independent processors (sometimes referred to as "cores") that may execute instructions contemporaneously. Although FIG. 9 shows multiple processors 902, the machine 900 may include a single processor with a single-core, a single processor with multiple cores (e.g., a multi-core processor), multiple processors with a single core, multiple processors with multiples cores, or any combination thereof.

The memory 904 includes a main memory 912, a static memory 914, and a storage unit 916, all accessible to the processors 902 via the bus 940. The main memory 904, the static memory 914, and the storage unit 916 store the instructions 908 embodying any one or more of the methodologies or functions described herein. The instructions 908 may also reside, completely or partially, within the main memory 912, within the static memory 914, within a machine-readable medium within the storage unit 916, within at least one of the processors 902 (e.g., within the processor's cache memory), or any suitable combination thereof, during execution thereof by the machine 900.

The I/O components 938 may include a wide variety of components to receive input, provide output, produce output, transmit information, exchange information, capture measurements, and so on. The specific I/O components 938 that are included in a particular machine will depend on the type of machine. For example, portable machines such as mobile phones may include a touch input device or other such input mechanisms, while a headless server machine will likely not include such a touch input device. It will be appreciated that the I/O components 938 may include many other components that are not shown in FIG. 9. In various examples, the I/O components 938 may include user output components 924 and user input components 926. The user output components 924 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 926 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 938 may include biometric components 928, motion components 930, environmental components 932, or position components 934, among a wide array of other components. For example, the biometric components 928 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 930 include acceleration sensor components (e.g., accelerometer), gravitation sensor components, and rotation sensor components (e.g., gyroscope).

The environmental components 932 include, for example, one or more cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad, or penta rear camera configurations on the front and rear sides of the client device 102. These multiple cameras systems may include a wide camera, an ultra-wide camera, a telephoto camera, a macro camera, and a depth sensor, for example.

The position components 934 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 938 further include communication components 936 operable to couple the machine 900 to a network 920 or devices 922 via respective coupling or connections. For example, the communication components 936 may include a network interface component or another suitable device to interface with the network 920. In further examples, the communication components 936 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 922 may be another machine or any of a wide variety of peripheral devices (e.g., a peripheral device coupled via a USB).

Moreover, the communication components 936 may detect identifiers or include components operable to detect identifiers. For example, the communication components 936 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 936, such as location via Internet Protocol (IP) geolocation, location via Wi-Fi® signal triangulation, location via detecting an NFC beacon signal that may indicate a particular location, and so forth.

The various memories (e.g., main memory 912, static memory 914, and memory of the processors 902) and storage unit 916 may store one or more sets of instructions and data structures (e.g., software) embodying or used by any one or more of the methodologies or functions described herein. These instructions (e.g., the instructions 908), when executed by processors 902, cause various operations to implement the disclosed examples.

The instructions 908 may be transmitted or received over the network 920, using a transmission medium, via a network interface device (e.g., a network interface component included in the communication components 936) and using any one of several well-known transfer protocols (e.g., HTTP). Similarly, the instructions 908 may be transmitted or received using a transmission medium via a coupling (e.g., a peer-to-peer coupling) to the devices 922.

Software Architecture

Figure 10:
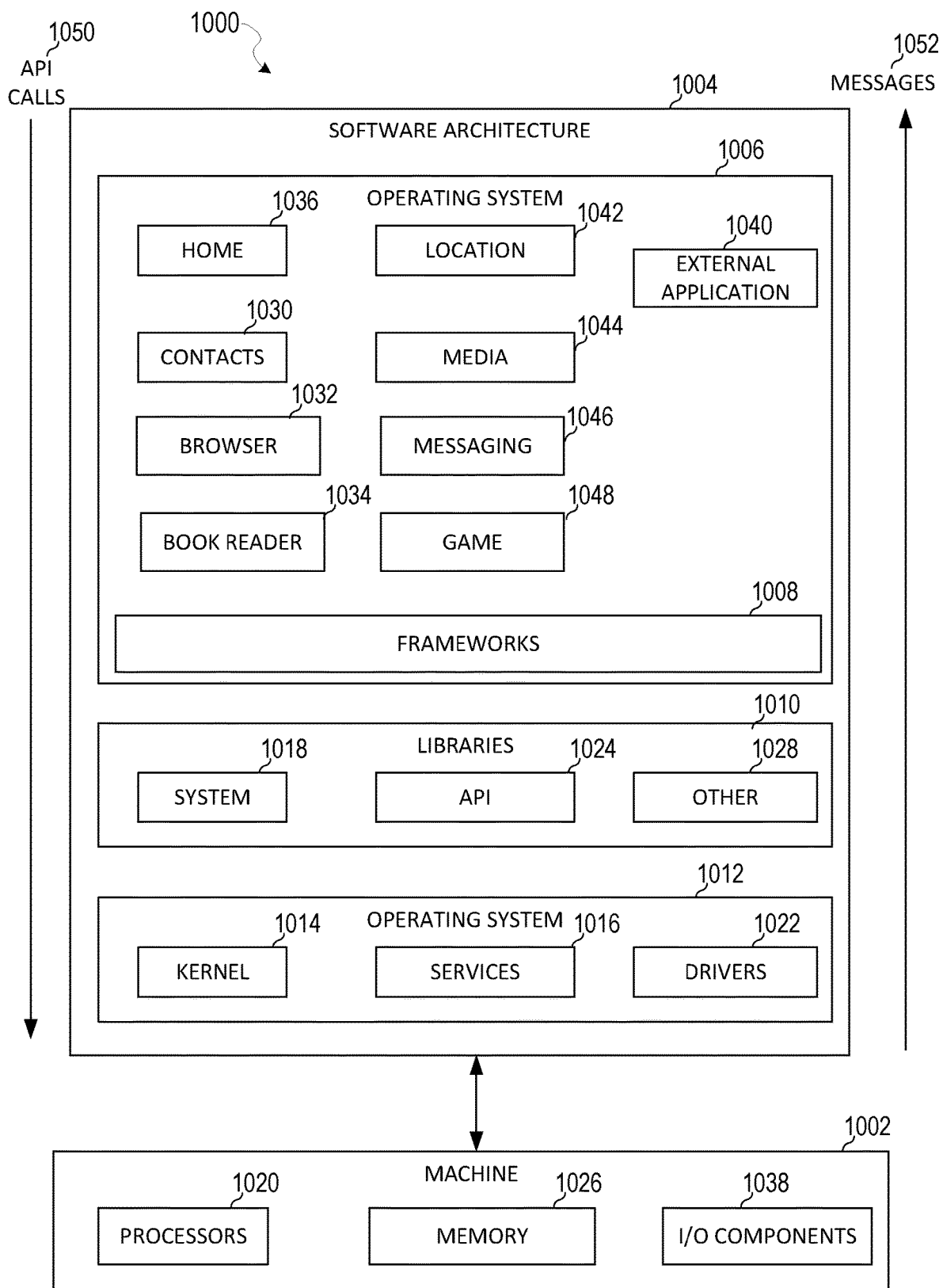
FIG. 10 is a block diagram showing a software architecture within which examples may be implemented.

FIG. 10 is a block diagram 1000 illustrating a software architecture 1004, which can be installed on any one or more of the devices described herein. The software architecture 1004 is supported by hardware such as a machine 1002 that includes processors 1020, memory 1026, and I/O components 1038. In this example, the software architecture 1004 can be conceptualized as a stack of layers, where each layer provides a particular functionality. The software architecture 1004 includes layers such as an operating system 1012, libraries 1010, frameworks 1008, and applications 1006. Operationally, the applications 1006 invoke API calls 1050 through the software stack and receive messages 1052 in response to the API calls 1050.

The operating system 1012 manages hardware resources and provides common services. The operating system 1012 includes, for example, a kernel 1014, services 1016, and drivers 1022. The kernel 1014 acts as an abstraction layer between the hardware and the other software layers. For example, the kernel 1014 provides memory management, processor management (e.g., scheduling), component management, networking, and security settings, among other functionality. The services 1016 can provide other common services for the other software layers. The drivers 1022 are responsible for controlling or interfacing with the underlying hardware. For instance, the drivers 1022 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1010 provide a common low-level infrastructure used by the applications 1006. The libraries 1010 can include system libraries 1018 (e.g., C standard library) that provide functions such as memory allocation functions, string manipulation functions, mathematic functions, and the like. In addition, the libraries 1010 can include API libraries 1024 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic content on a display), database libraries (e.g., SQLite to provide various relational database functions), web libraries (e.g., WebKit to provide web browsing functionality), and the like. The libraries 1010 can also include a wide variety of other libraries 1028 to provide many other APIs to the applications 1006.

The frameworks 1008 provide a common high-level infrastructure that is used by the applications 1006. For example, the frameworks 1008 provide various GUI functions, high-level resource management, and high-level location services. The frameworks 1008 can provide a broad spectrum of other APIs that can be used by the applications 1006, some of which may be specific to a particular operating system or platform.

In an example, the applications 1006 may include a home application 1036, a contacts application 1030, a browser application 1032, a book reader application 1034, a location application 1042, a media application 1044, a messaging application 1046, a game application 1048, and a broad assortment of other applications such as an external application 1040. The applications 1006 are programs that execute functions defined in the programs. Various programming languages can be employed to create one or more of the applications 1006, structured in a variety of manners, such as object-oriented programming languages (e.g., Objective-C, Java, or C++) or procedural programming languages (e.g., C or assembly language). In a specific example, the external application 1040 (e.g., an application developed using the ANDROID™ or IOS™ SDK by an entity other than the vendor of the particular platform) may be mobile software running on a mobile operating system such as IOS™, ANDROID™, WINDOWS® Phone, or another mobile operating system. In this example, the external application 1040 can invoke the API calls 1050 provided by the operating system 1012 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, PDAs, smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 902 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm).

In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium," and "device-readable medium" mean the same thing and may be used interchangeably in this disclosure.

"Ephemeral message" refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," and "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. A method comprising:
   accessing a conversation interface of a messaging application on a web browser;
   presenting the conversation interface in a window associated with the web browser, the conversation interface comprising a plurality of conversation elements;
   accessing a focus status of the window;
   in response to determining that the focus status indicates that the window has lost focus, obscuring a first subset of the plurality of conversation elements;
   computing a duration between the focus status indicating that the window has lost focus and the focus status being in focus;
   comparing the duration to a threshold duration; and
   in response to determining that the duration transgresses the threshold duration, presenting an option to re-open the conversation interface, wherein the first subset of the plurality of conversation elements is revealed in response to selection of the option.

2. The method of claim 1, wherein the web browser is implemented on a desktop computer.

3. The method of claim 1, wherein the accessing comprises:
   retrieving a universal resource locator (URL) of the messaging application;
   downloading a markup language document corresponding to the messaging application; and
   processing the markup language document by the web browser to display the conversation interface.

4. The method of claim 1, further comprising modifying a display attribute of a second subset of the plurality of conversation elements, the second subset being different than the first subset.

5. The method of claim 1, wherein the focus status changes from being in focus to losing focus in response to determining that a different window of the web browser is being viewed.

6. The method of claim 1, wherein the focus status changes from being in focus to losing focus in response to detecting user interaction with a portion of a display that excludes the window.

7. The method of claim 1, wherein the focus status changes from being in focus to losing focus in response to determining that the window has been minimized or has been obscured by a different window.

8. The method of claim 1, wherein the focus status is received from the web browser.

9. The method of claim 1, wherein the plurality of conversation elements include a chat region that includes one or more messages exchanged in a conversation, a chat input region for enabling a user to compose a message, a presence region that indicates an activity state of each of a plurality of friends, a friends region that lists the plurality of friends with whom the user has previously engaged in a conversation, and a phone call region for placing a phone call to a given friend.

10. The method of claim 9, wherein the first subset of the plurality of conversation elements includes the chat region and the presence region.

11. The method of claim 10, further comprising modifying a display attribute of the chat input region.

12. The method of claim 11, wherein modifying the display attribute comprises reducing an opacity of the chat input region by a specified amount.

13. The method of claim 1, wherein obscuring the first subset of the plurality of conversation elements comprises presenting an overlay on top of a chat region that includes one or more messages exchanged in a conversation, the overlay comprising a message indicting that a user of the web browser is no longer present.

14. The method of claim 13, wherein the overlay comprises an avatar of the user.

15. The method of claim 13, further comprising:
after obscuring the first subset of the plurality of conversation elements, determining that the focus status of the window is in focus;
in response to determining that the focus status of the window is in focus, detecting an interaction with the conversation interface; and
revealing the first subset of the plurality of conversation elements in response to detecting the interaction with the conversation interface.

16. A system comprising:
at least one processor configured to perform operations comprising:
accessing a conversation interface of a messaging application on a web browser;
presenting the conversation interface in a window associated with the web browser, the conversation interface comprising a plurality of conversation elements;
accessing a focus status of the window;
in response to determining that the focus status indicates that the window has lost focus, obscuring a first subset of the plurality of conversation elements;
computing a duration between the focus status indicating that the window has lost focus and the focus status being in focus;
comparing the duration to a threshold duration; and
in response to determining that the duration transgresses the threshold duration, presenting an option to re-open the conversation interface, wherein the first subset of the plurality of conversation elements is revealed in response to selection of the option.

17. The system of claim 16, wherein the web browser is implemented on a desktop computer.

18. The system of claim 16, wherein the accessing comprises:
retrieving a universal resource locator (URL) of the messaging application;
downloading a markup language document corresponding to the messaging application; and
processing the markup language document by the web browser to display the conversation interface.

19. A non-transitory machine-readable storage medium that includes instructions that, when executed by one or more processors of a machine, cause the machine to perform operations comprising:
accessing a conversation interface of a messaging application on a web browser;
presenting the conversation interface in a window associated with the web browser, the conversation interface comprising a plurality of conversation elements;
accessing a focus status of the window;
in response to determining that the focus status indicates that the window has lost focus, obscuring a first subset of the plurality of conversation elements;
computing a duration between the focus status indicating that the window has lost focus and the focus status being in focus;
comparing the duration to a threshold duration; and
in response to determining that the duration transgresses the threshold duration, presenting an option to re-open the conversation interface, wherein the first subset of the plurality of conversation elements is revealed in response to selection of the option.

20. The non-transitory machine-readable storage medium of claim 19, wherein the web browser is implemented on a desktop computer.

* * * * *